(12) United States Patent
Liu et al.

(10) Patent No.: US 12,606,041 B2
(45) Date of Patent: Apr. 21, 2026

(54) REFRIGERATING SYSTEM AND CHARGING SYSTEM

(71) Applicant: HUAWEI DIGITAL POWER TECHNOLOGIES CO., LTD., Shenzhen (CN)

(72) Inventors: Baoquan Liu, Shenzhen (CN); Quanxi Lin, Dongguan (CN); Fei Ning, Shenzhen (CN); Minggui Hu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 134 days.

(21) Appl. No.: 18/599,783

(22) Filed: Mar. 8, 2024

(65) Prior Publication Data

US 2024/0208344 A1    Jun. 27, 2024

Related U.S. Application Data

(63) Continuation of application No. PCT/CN2022/103458, filed on Jul. 1, 2022.

(30) Foreign Application Priority Data

Oct. 20, 2021    (CN) .......................... 202111221623.8

(51) Int. Cl.
B60L 53/302 (2019.01)
F25B 41/20 (2021.01)
(Continued)

(52) U.S. Cl.
CPC ............. *B60L 53/302* (2019.02); *F25B 41/20* (2021.01); *F25B 41/40* (2021.01); *F25B 49/022* (2013.01);
(Continued)

(58) Field of Classification Search
CPC ............................... B60L 53/302; F25B 49/02
See application file for complete search history.

(56) References Cited

U.S. PATENT DOCUMENTS

2019/0061543 A1*    2/2019    Jovet ..................... B60L 53/302

FOREIGN PATENT DOCUMENTS

CN    103370583 A    10/2013
CN    107147154 A    9/2017
(Continued)

OTHER PUBLICATIONS

Extended European Search Report in European Appln. No. 22882346. 4, mailed on Nov. 13, 2024, 11 pages.
(Continued)

*Primary Examiner* — Jonathan Bradford
(74) *Attorney, Agent, or Firm* — Fish & Richardson P.C.

(57) ABSTRACT

A refrigerating system include a heat management module, a direct cooling module, a plurality of heat exchange modules, and a plurality of cooling pipes. The heat management module may send, to the direct cooling module, control information that indicates that the charging pile needs to charge a terminal device. The direct cooling module may be configured to convert a gas refrigerant transmitted in a second pipe assembly into a liquid refrigerant, and transmit the liquid refrigerant to each heat exchange module and each cooling pipe through the first pipe assembly.

20 Claims, 8 Drawing Sheets

(51) Int. Cl.
    F25B 41/40         (2021.01)
    F25B 49/02         (2006.01)

(52) U.S. Cl.
    CPC .... F25B 49/027 (2013.01); *F25B 2600/2515*
              (2013.01); *F25B 2700/21* (2013.01)

(56)               References Cited

FOREIGN PATENT DOCUMENTS

| | | | |
|---|---|---|---|
| CN | 207252115 | U | 4/2018 |
| CN | 207360115 | U | 5/2018 |
| CN | 110014921 | A | 7/2019 |
| CN | 209700423 | U | 11/2019 |
| CN | 209930767 | U | 1/2020 |
| CN | 110843572 | A | 2/2020 |
| CN | 111829214 | A | 10/2020 |
| CN | 112448063 | A | 3/2021 |
| CN | 213984141 | U | 8/2021 |
| CN | 114111131 | A | 3/2022 |

OTHER PUBLICATIONS

Zhu, "Cost comparison of thermal management system for pure electric vehicles," Automotive Electronic Design, Mar. 19, 2019, retrieved on Dec. 3, 2024, retrieved from URL <https://chuneng.bjx.com.cn/news/20190319/969820.shtml>, 8 pages (with English machine translation).
International Search Report and Written Opinion in International Appln. No. PCT/CN2022/103458, mailed on Sep. 28, 2022, 21 pages (with English translation).

* cited by examiner

S

REFRIGERATING SYSTEM AND CHARGING SYSTEM

CROSS-REFERENCE TO RELATED APPLICATIONS

This application is a continuation of International Application No. PCT/CN2022/103458, filed on Jul. 1, 2022, which claims priority to Chinese Patent Application No. 202111221623.8, filed on Oct. 20, 2021. The disclosures of the aforementioned applications are hereby incorporated by reference in their entireties.

TECHNICAL FIELD

This application relates to the field of energy technologies, and more specifically, to a refrigerating system and a charging system in the field of energy technologies.

BACKGROUND

With vigorous development of the new energy industry, a charging requirement of a terminal device (such as a new energy vehicle) is also increasing. Currently, a new energy vehicle is usually charged by using a charging pile (or a charging heap, or the like). To shorten charging time and implement fast charging of the new energy vehicle, a charging pile needs to meet a high-power charging requirement of the new energy vehicle.

In a process of charging the new energy vehicle, a power module, a charging gun, and the like in the charging pile generate a large amount of heat, which affects safety of the charging pile. Therefore, there is an urgent need for a technical solution that can improve a heat exchange coefficient of the charging pile and implement fast heat dissipation for the charging pile.

SUMMARY

This application provides a refrigerating system and a charging system. A heat management module controls a direct cooling module, so that not only a heat exchange coefficient of a charging pile can be improved, and heat can be effectively dissipated for the charging pile, but also fast heat dissipation can be implemented for the charging pile, and safety of the charging pile can be ensured.

According to a first aspect, this application provides a refrigerating system, which may include a heat management module, a direct cooling module, a plurality of heat exchange modules, and a plurality of cooling pipes.

An input end of the heat management module may be configured to connect to a control module of a charging pile, an output end of the heat management module may be configured to connect to an input end of the direct cooling module, an output end of the direct cooling module may be configured to connect to a first end of a first pipe assembly, second ends of the first pipe assembly may be configured to connect to input ends of the plurality of heat exchange modules and input ends of the plurality of cooling pipes, output ends of the heat exchange modules and output ends of the cooling pipes may be configured to separately connect to first ends of a second pipe assembly, a second end of the second pipe assembly may be configured to connect to an input end of the direct cooling module, each heat exchange module may further be connected to a corresponding power module in the charging pile, and each cooling pipe is disposed inside a corresponding charging gun in the charging pile and a cable connected to the charging gun.

Based on the foregoing connection relationship, the following may be further obtained:

The heat management module may be configured to send control information to the direct cooling module based on charging information from the control module.

The charging information may indicate that the charging pile needs to charge a terminal device.

The direct cooling module may be configured to: convert, based on the control information, a gas refrigerant transmitted in the second pipe assembly into a liquid refrigerant, and transmit the liquid refrigerant to each heat exchange module and each cooling pipe through the first pipe assembly.

Each heat exchange module may be configured to dissipate heat for a corresponding power module based on the liquid refrigerant.

Each cooling pipe may be configured to dissipate, based on the liquid refrigerant, heat for a corresponding charging gun and a cable connected to the charging gun.

It should be explained that the heat exchange module may be built in the power module, or fastened outside the power module. Certainly, the heat exchange module and the power module may be connected in another manner. This is not limited in this application.

It may be understood that because the heat exchange module is configured to dissipate heat for the power module, and the cooling pipe is configured to dissipate heat for the charging gun and the cable connected to the charging gun, to achieve a better heat dissipation effect, a quantity of heat exchange modules may be equal to a quantity of power modules, and a quantity of cooling pipes may be equal to a quantity of charging guns.

Certainly, a plurality of (for example, two or three) power modules may share one heat exchange module. In other words, one heat exchange module may be fastened outside the plurality of power modules, and the heat exchange module dissipates heat for the plurality of power modules.

Optionally, the heat exchange module may use a plate heat exchanger. Certainly, the heat exchange module may alternatively use another type of heat exchanger. This is not limited in this application.

In this application, the heat management module controls the direct cooling module based on the charging information, the heat exchange module directly exchanges heat with the power module, and the cooling pipe directly exchanges heat with the charging gun and the cable. This not only implements heat dissipation through the heat exchange module for the power module (that is, cools the power module), but also implements heat dissipation through the cooling pipe for the charging gun and the cable (that is, cools the charging gun and the cable). In addition, a heat exchange coefficient of the charging pile is improved, a cooling effect of the charging pile is significantly improved, and a heat dissipation speed of the charging pile is accelerated, thereby ensuring safety of the charging pile.

In a possible implementation, the refrigerant (including a liquid refrigerant and a gas refrigerant) uses a phase change refrigerant (for example, a low-temperature environment-friendly refrigerant R134a, which has low conductivity and a boiling point of −26.1° C.). A refrigerant such as R134y may alternatively be used.

In this application, a use amount of refrigerants is small and the refrigerant is less likely to leak. In addition, even if the refrigerant leaks, the refrigerant will evaporate quickly, which is less likely to affect insulation performance of the refrigerating system or cause short circuit.

In a possible implementation, the direct cooling module may include a compressor, a condenser, and a fan.

An input end of the compressor may be connected to the output end of the heat management module and the second pipe assembly, an output end of the compressor may be connected to an input end of the condenser, an input end of the condenser may further be connected to the output end of the heat management module, and an output end of the condenser is connected to the first pipe assembly.

The compressor may be configured to: compress, based on the control information, the gas refrigerant transmitted in the second pipe assembly, and transmit the compressed gas refrigerant to the condenser.

The condenser may be configured to: convert the compressed gas refrigerant into the liquid refrigerant based on the control information, and transmit the liquid refrigerant to each heat exchange module and each cooling pipe through the first pipe assembly.

The fan may be configured to dissipate heat for the condenser.

In this application, the compressor and the condenser convert, under control of the control module, the gas refrigerant transmitted in the second pipe assembly into the liquid refrigerant, to implement a phase change of the refrigerant, so that the heat exchange module can dissipate heat for the power module, and the cooling pipe can dissipate heat for the charging gun and the cable connected to the charging gun.

In an example, the first pipe assembly may include a first primary pipe and a plurality of first secondary pipes.

The plurality of first secondary pipes may include a first part of first secondary pipes and a second part of first secondary pipes. The first part of first secondary pipes may be connected to the plurality of heat exchange modules in a one-to-one correspondence, and the second part of first secondary pipes may be connected to the plurality of cooling pipes in a one-to-one correspondence.

Optionally, a first end of the first primary pipe may be configured to connect to the output end of the condenser, a second end of the first primary pipe may be configured to connect to a first end of each first secondary pipe in the first part of first secondary pipes and a first end of each first secondary pipe in the second part of first secondary pipes, a second end of a first secondary pipe in the first part of first secondary pipes may be configured to correspondingly connect to a heat exchange module in the plurality of heat exchange modules, and a second end of a first secondary pipe in the second part of the first secondary pipes may be configured to correspondingly connect to a cooling pipe in the plurality of cooling pipes.

In a possible implementation, a throttle valve (which may also be referred to as an expansion valve) may be disposed on each first secondary pipe. The throttle valve may be configured to adjust a flow rate of the liquid refrigerant transmitted in each first secondary pipe.

It can be understood from the foregoing descriptions and an operating principle of the throttle valve that, the refrigerant (namely, the refrigerant entering the heat exchange module and the cooling pipe) output from the throttle valve is a low-temperature and low-pressure liquid refrigerant. The heat exchange module dissipates heat for the power module based on the low-temperature and low-pressure liquid refrigerant, and the cooling pipe dissipates heat for the charging gun and the cable based on the low-temperature and low-pressure liquid refrigerant. Then, the low-temperature and low-pressure liquid refrigerant returns to the compressor through the second pipe assembly. The compressor compresses the low-temperature and low-pressure liquid refrigerant to obtain a high-temperature and high-pressure gas refrigerant. The high-temperature and high-pressure gas refrigerant enters the condenser, and the condenser may output a medium-temperature and high-pressure liquid refrigerant. The medium-temperature and high-pressure liquid refrigerant enters the throttle valve. The throttle valve may reduce a pressure of the medium-temperature and high-pressure liquid refrigerant. At this time, the medium-temperature and high-pressure liquid refrigerant expands in volume, so that a low-temperature and low-pressure liquid refrigerant (namely, a refrigerant that enters the heat exchange module and the cooling pipe) is obtained.

It should be noted that the foregoing low temperature, medium temperature, high temperature, low voltage, and high voltage are all relative, and are not absolute low temperature, medium temperature, high temperature, low voltage, and high voltage.

For example, the compressor is used as a reference. A temperature of a refrigerant input into the compressor is lower than a temperature of a refrigerant output by the compressor, and a pressure of a refrigerant input into the compressor is lower than a pressure of the refrigerant output by the compressor. It may be obtained with reference to an operating principle of the compressor that refrigerants (namely, refrigerants transmitted in the second pipe assembly from the heat exchange module and the cooling pipe) input into the compressor may be low-temperature and low-pressure liquid refrigerants, and refrigerants output by the compressor may be high-temperature and high-pressure liquid refrigerants.

It should be noted that, a boiling point of the refrigerant is generally lower than 0° C., and the low-temperature and low-pressure liquid refrigerant output by the throttle valve is transmitted to the heat exchange module and the cooling pipe through the first pipe assembly. In a process in which the heat exchange module dissipates heat for the power module and the cooling pipe dissipates heat for the charging gun and the cable, the liquid refrigerant becomes a gas refrigerant due to heat absorption (that is, the refrigerants output by the heat exchange module and the cooling pipe to the compressor through the second pipe assembly is low-temperature and low-pressure gas refrigerants).

For another example, the condenser is used as a reference. A temperature of a refrigerant (namely, the refrigerant output by the compressor) input into the condenser is higher than the temperature of the refrigerant output by the condenser, and a pressure of the refrigerant input into the condenser is basically the same as the pressure of the refrigerant output by the compressor. It may be learned with reference to the operating principle of the condenser that the refrigerant output by the condenser may be a medium-temperature and high-pressure liquid refrigerant.

For still another example, the throttle valve is used as a reference. A temperature of a refrigerant (namely, the refrigerant output by the condenser) input into the throttle valve is higher than a temperature of the refrigerant output by the throttle valve, and a pressure of the refrigerant input into the throttle valve is higher than a pressure of the refrigerant output by the throttle valve. Therefore, the refrigerant input into the throttle valve may be a medium-temperature and high-pressure liquid refrigerant, and the refrigerant output by the throttle valve may be a low-temperature and low-pressure liquid refrigerant.

In another example, the second pipe assembly may include a second primary pipe and a plurality of second secondary pipes.

The plurality of second secondary pipes include a first part of second secondary pipes and a second part of second secondary pipes. The first part of second secondary pipes may be connected to the plurality of heat exchange modules in a one-to-one correspondence, and the second part of second secondary pipes are connected to the plurality of cooling pipes in a one-to-one correspondence.

A first end of a second secondary pipe in the first part of second secondary pipes may be configured to correspondingly connect to a heat exchange module in the plurality of heat exchange modules, and a first end of a second secondary pipe in the second part of second secondary pipes may be configured to correspondingly connect to a cooling pipe in the plurality of cooling pipes. Second ends of the first part of second secondary pipes and second ends of the second part of second secondary pipes may be configured to separately connect to first ends of the second primary pipe, and a second end of the second primary pipe may be configured to connect to the input end of the direct cooling module.

In this application, refrigerants in the first primary pipe, the second primary pipe, the plurality of first secondary pipes, and the plurality of second secondary pipes may be used to implement heat dissipation of the plurality of power modules, the plurality of charging guns, and cables.

In a possible implementation, a first sensor may be disposed on each first secondary pipe. The first sensor may be configured to collect a temperature of the gas refrigerant transmitted in a first secondary pipe in which the first sensor is located.

Similarly, a second sensor may be disposed on each second secondary pipe. The second sensor may be configured to collect a temperature of the gas refrigerant transmitted in the second secondary pipe in which the second sensor is located.

In another possible implementation, a third sensor may be disposed on each power module. The third sensor may be configured to collect an actual temperature of a power module in which the third sensor is located.

Similarly, a fourth sensor may be disposed on each charging gun. The fourth sensor may be configured to collect an actual temperature of a charging gun in which the fourth sensor is located.

Optionally, a fifth sensor may be disposed on an outer surface of the charging pile. The fifth sensor may be configured to collect an ambient temperature of the charging pile.

In a possible implementation, the heat management module may receive the charging information from the control module, and obtain (from the fifth sensor) the ambient temperature of the charging pile, the actual temperature of the power module (from the third sensor), and the actual temperature of the charging gun (from the fourth sensor).

When the actual temperature of the power module is higher than a preset first temperature upper limit for preset first duration, or when the actual temperature of the charging gun is higher than a preset second temperature upper limit for preset second duration, the heat management module obtains a cooling power of the direct cooling module based on the charging information, the ambient temperature of the charging pile, the actual temperature of the power module, and the actual temperature of the charging gun. The heat management module delivers the cooling power of the direct cooling module as the control information to the direct cooling module, and control the throttle valve to open.

Further, the heat management module obtains, based on the charging information, the ambient temperature of the charging pile, and the actual temperature of the power module, a cooling power required for reducing the actual temperature of the power module to a target temperature of the power module. Similarly, the heat management module may obtain, based on the charging information, the ambient temperature of the charging pile, and the actual temperature of the charging gun, a cooling power required for reducing the actual temperature of the charging gun to a target temperature of the charging gun. Then, the heat management module may add the cooling power required for reducing the actual temperature of the power module to the target temperature of the power module and the cooling power required for reducing the actual temperature of the charging gun to the target temperature of the charging gun, to obtain the cooling power of the direct cooling module.

Optionally, the target temperature of the power module may be lower than or equal to the preset first temperature upper limit, and the target temperature of the charging gun is lower than or equal to the preset second temperature upper limit.

In an example, the heat management module may obtain a heat loss of the power module based on the input power of the power module and conversion efficiency of the power module. The heat management module obtains, based on the charging information, the ambient temperature of the charging pile, the actual temperature of the power module, the preset target temperature of the power module, the heat loss of the power module, and a first correspondence, the cooling power required for reducing the actual temperature of the power module to the target temperature of the power module.

The first correspondence may indicate a correspondence between the cooling power required for reducing the actual temperature of the power module to the target temperature of the power module, and the ambient temperature of the charging pile, the actual temperature of the power module, the target temperature of the power module, and the heat loss of the power module.

In another example, the heat management module may obtain a heat loss of the charging gun based on a current and impedance of the charging gun by using Ohm's law. The heat management module obtains, based on the charging information, the ambient temperature of the charging pile, the actual temperature of the charging gun, the preset target temperature of the charging gun, the heat loss of the charging gun, and a second correspondence, the cooling power required for reducing the actual temperature of the charging gun to the target temperature of the charging gun.

The second correspondence indicates a correspondence between the cooling power required for reducing the actual temperature of the charging gun to the target temperature of the charging gun, and the ambient temperature of the charging pile, the actual temperature of the charging gun, the target temperature of the charging gun, and the heat loss of the charging gun.

In a possible implementation, the heat management module may further obtain a temperature difference between a temperature of the liquid refrigerant transmitted in any one of the plurality of first secondary pipes and a temperature of the gas refrigerant transmitted in a corresponding second secondary pipe in the plurality of second secondary pipes. The heat management module may adjust an opening degree of the throttle valve based on the temperature difference.

Further, when the temperature difference is greater than a preset temperature threshold, it indicates that heat dissipation through the heat exchange module or the cooling pipe is not effective. In this case, the heat management module may control the opening degree of the throttle valve to increase.

When the temperature difference is less than or equal to the preset temperature threshold, it indicates that heat dissipation through the heat exchange module or the cooling pipe is effective. In this case, the actual temperature of the power module is lower than the target temperature of the power module, or the actual temperature of the charging gun is lower than the target temperature of the charging gun. Then, the heat management module may re-obtain a cooling power of the direct cooling module based on the actual temperature of the power module and the actual temperature of the charging gun (refer to the foregoing process) in such case, control the direct cooling module to operate at the re-obtained cooling power of the direct cooling module (that is, the direct cooling module operates at a derated power (that is, an output power may be reduced by reducing a rate of the compressor, or the like)), and control the opening degree of the corresponding throttle valve to decrease.

In a possible implementation, when the charging pile is shut down or faulty, the heat management module may control the direct cooling module to shut down, and control all throttle valves to be closed.

Compared with cooling using coolant, the refrigerating system provided in this application has a compact structure and is easy to maintain. More importantly, heat dissipation efficiency of the refrigerating system provided in this application is far higher than heat dissipation efficiency of cooling using coolant, so that heat can be quickly dissipated for the charging pile, and safety of the charging pile can be ensured.

In addition, a quantity and power of charging piles are not limited in this application. In other words, the refrigerating system provided in this application may be used for heat dissipation for one or more charging piles, and may be a high-power charging system including one high-power charging pile or a plurality of charging piles, to meet a charging requirement of a high-power new energy vehicle.

According to a second aspect, this application provides a charging system, which may include a charging pile and the refrigerating system provided in the first aspect and the possible implementations of the first aspect.

Optionally, a control module in the charging pile may be connected to a heat management module in the refrigerating system. The control module sends charging information to the heat management module. One of a plurality of heat exchange modules in the refrigerating system may be connected to a corresponding power module in a plurality of power modules in the charging pile, and the heat exchange module may dissipate heat for the power module.

One of a plurality of cooling pipes in the refrigerating system may be disposed inside a corresponding charging gun in the charging pile, and the cooling pipe may dissipate heat for the corresponding charging gun and a cable connected to the charging gun.

The heat management module in this application may control a direct cooling module. The direct cooling module may convert a gas refrigerant output by the heat exchange module and the cooling pipe into a liquid refrigerant, so that the heat exchange module dissipates heat for the power module based on the liquid refrigerant, and the cooling pipe dissipates heat for the charging gun and the cable connected to the charging gun based on the liquid refrigerant. This not only improves a heat exchange coefficient of one or more charging piles, but also accelerates a heat dissipation rate of the one or more charging piles. In addition, aging speeds of the power module and the charging gun can be further reduced, thereby improving running reliability of the entire charging system.

In a possible implementation, the charging system includes one charging pile.

Optionally, the refrigerating system may include a plurality of heat exchange modules, and the charging pile may include a plurality of power modules.

One heat exchange module may be connected to a corresponding power module, and the heat exchange module is configured to dissipate heat for the power module.

Further, the refrigerating system may further include a plurality of cooling pipes, and the charging pile S2 may further include a plurality of charging guns.

One cooling pipe may be disposed inside a corresponding charging gun, and the cooling pipe is configured to dissipate heat for the charging gun and a cable connected to the charging gun.

In an example, the heat management module may be connected to a control module in the charging pile, and both the direct cooling module and the heat management module are disposed inside the charging pile.

In other words, both the direct cooling module and the heat management module are disposed inside the charging pile. Therefore, the charging pile may be referred to as an integrated pile.

It should be noted that, for detailed descriptions of a throttle valve and the like in the refrigerating system, refer to the foregoing descriptions. Details are not described herein again in this application.

In the charging system provided in this application, the direct cooling module and the heat management module may be located inside the charging pile, to form an integrated pile. In other words, the refrigerating system in this application may be configured to dissipate heat for the integrated pile.

In another possible implementation, the charging system may include a plurality of charging piles, and the plurality of charging piles may be connected in parallel.

A heat management module may be connected to a control module in each of the plurality of charging piles, and both the direct cooling module and the heat management module are disposed outside the plurality of charging piles. In other words, heat dissipation of the power module and the charging gun in each charging pile can be implemented through one direct cooling module and one heat management module. Therefore, the charging system may be referred to as a charging system including a split-type pile.

Similarly, for detailed descriptions of the throttle valve and the like in the refrigerating system, refer to the foregoing descriptions. Details are not described herein again in this application.

In the charging system provided in this application, the direct cooling modules and the heat management modules are located outside the plurality of charging piles, to form split-type piles. In other words, the refrigerating system provided in this application may be configured to dissipate heat for the split-type piles.

The split-type pile in this application has a compact structure, so that investment costs and operation and maintenance costs of the charging system can be reduced, and utilization of the direct cooling module can be improved.

Optionally, the charging pile (one charging pile or each of the plurality of charging piles) may include the control module, the plurality of power modules, and the plurality of charging guns.

The control module may be connected to each of the plurality of power modules, and any power module in the plurality of power modules may be connected to any charging gun in the plurality of charging guns through a corresponding cable.

Based on the foregoing connection relationship, the following may be further obtained:

The control module may be configured to control each power module, and is further configured to send the charging information to the refrigerating system (that is, to the heat management module in a direct cooling system).

Each power module may be configured to: under control of the control module, output a direct current to the any charging gun based on an alternating current provided by an alternating current power supply or a direct current provided by a direct current power supply.

Each charging gun may be configured to charge a terminal device based on the direct current output by the any power module.

According to a third aspect, this application provides a method for controlling a charging system. The method may include: A heat management module sends control information to a direct cooling module based on charging information (which may indicate that one or more charging piles need to charge corresponding terminal devices) from a control module in a charging pile. The heat management module may control, based on the control information, the direct cooling module to convert a gas refrigerant transmitted in a second pipe assembly into a liquid refrigerant, and transmit the liquid refrigerant to each heat exchange module and each cooling pipe in the one or more charging piles through a first pipe assembly. Then, each heat exchange module dissipates heat for a corresponding power module based on the liquid refrigerant, and each cooling pipe dissipates heat for a corresponding charging gun and a cable connected to the charging gun based on the liquid refrigerant.

The heat management module in this application may control a direct cooling module. The direct cooling module may convert a gas refrigerant output by the heat exchange module and the cooling pipe into a liquid refrigerant, so that the heat exchange module dissipates heat for the power module based on the liquid refrigerant, and the cooling pipe dissipates heat for the charging gun and the cable connected to the charging gun based on the liquid refrigerant. This not only improves a heat exchange coefficient of the one or more charging piles, but also accelerates a heat dissipation rate of the one or more charging piles. In addition, aging speeds of the power module and the charging gun can be further reduced, thereby improving running reliability of the entire charging system.

Optionally, for detailed descriptions of the direct cooling module, the first pipe assembly, and the second pipe assembly, refer to the foregoing descriptions. Details are not described herein again in this application.

In a possible implementation, the control method provided in this application may further include: The heat management module controls a throttle valve disposed on a first secondary pipe, to adjust a flow rate of a liquid refrigerant transmitted in each first secondary pipe.

In an example, a first sensor may be disposed on each first secondary pipe. The first sensor may collect a temperature of a liquid refrigerant transmitted in a first secondary pipe in which the first sensor is located.

In another example, a second sensor may be disposed on each second secondary pipe. The second sensor may collect a temperature of a gas refrigerant transmitted in the second secondary pipe in which the second sensor is located.

In still another example, a third sensor may be disposed on each power module. The third sensor may collect an actual temperature of a power module in which the third sensor is located.

In yet another example, a fourth sensor may be disposed on each charging gun. The fourth sensor may collect an actual temperature of a charging gun in which the fourth sensor is located.

In still yet another example, a fifth sensor may be disposed on an outer surface of the charging pile (any one of the one or more charging piles). The fifth sensor may be configured to collect an ambient temperature of the charging pile.

In a possible implementation, that the heat management module sends the control information to the direct cooling module based on the charging information from the control module in the charging pile may include:

The heat management module receives the charging information from the control module, and obtains the ambient temperature (which may be obtained from the fifth sensor) of the charging pile, the actual temperature (which may be obtained from the third sensor) of the power module, and the actual temperature (which may be obtained from the fourth sensor) of the charging gun. When the actual temperature of the power module is higher than a preset first temperature upper limit (for example, 60° C.) for preset first duration (for example, 10 seconds), or when the actual temperature of the charging gun is higher than a preset second temperature upper limit (for example, 80° C.) for preset second duration (for example, 10 seconds), the heat management module may obtain a cooling power of the direct cooling module based on the charging information, the ambient temperature of the charging pile, the actual temperature of the power module, and the actual temperature of the charging gun. The heat management module delivers the cooling power of the direct cooling module as the control information to the direct cooling module, and control the throttle valve to open.

Further, when the actual temperature of the power module is higher than the preset first temperature upper limit (for example, 60° C.) for the preset first duration (for example, 10 seconds), or when the actual temperature of the charging gun is higher than the preset second temperature upper limit (for example, 80° C.) for the preset second duration (for example, 10 seconds), the heat management module may obtain the cooling power of the direct cooling module based on the charging information, the ambient temperature of the charging pile, the actual temperature of the power module, and the actual temperature of the charging gun using the following process:

The heat management module obtains, based on the charging information, the ambient temperature of the charging pile, and the actual temperature of the power module, a cooling power required for reducing the actual temperature of the power module to a target temperature (for example, 40° C., which may be lower than or equal to the preset first temperature upper limit) of the power module. Similarly, the heat management module may further obtain, based on the charging information, the ambient temperature of the charging pile, and the actual temperature of the charging gun, a cooling power required for reducing the actual temperature of the charging gun to a target temperature (for example, 50° C., which may be lower than or equal to the preset second temperature upper limit) of the charging gun. The heat management module may add the cooling power required for reducing the actual temperature of the power module to the target temperature of the power module and the cooling power required for reducing the actual temperature of the charging gun to the target temperature of the charging gun, to obtain the cooling power of the direct cooling module.

In an example, the heat management module may obtain, according to the following process, the cooling power required for reducing the actual temperature of the power module to the target temperature of the power module:

The heat management module may obtain a heat loss of the power module based on an input power of the power module and conversion efficiency of the power module. The heat management module may obtain, based on the charging information, the ambient temperature of the charging pile, the actual temperature of the power module, the preset target temperature of the power module, the heat loss of the power module, and a first correspondence (refer to the foregoing descriptions), the cooling power required for reducing the actual temperature of the power module to the target temperature of the power module.

In another example, the heat management module may obtain, according to the following process, the cooling power required for reducing the actual temperature of the charging gun to the target temperature of the charging gun:

The heat management module may obtain a heat loss of the charging gun based on a current and impedance of the charging gun by using Ohm's law. The heat management module may obtain, based on the charging information, the ambient temperature of the charging pile, the actual temperature of the charging gun, the preset target temperature of the charging gun, the heat loss of the charging gun, and a second correspondence (refer to the foregoing descriptions), the cooling power required for reducing the actual temperature of the charging gun to the target temperature of the charging gun.

In a possible implementation, the control method provided in this application may further include: The heat management module obtains a temperature difference between a temperature of the liquid refrigerant transmitted in any one of the plurality of first secondary pipes and a temperature of the gas refrigerant transmitted in a corresponding second secondary pipe in the plurality of second secondary pipes. The heat management module may adjust an opening degree of the throttle valve based on the temperature difference.

Further, the heat management module may adjust the opening degree of the throttle valve according to the following two cases:

Case 1: When the temperature difference is greater than a preset temperature threshold, it indicates that heat dissipation through the heat exchange module or the cooling pipe is not effective. In this case, the heat management module may control the opening degree of the throttle valve to increase.

Case 2: When the temperature difference is less than or equal to the preset temperature threshold, it indicates that heat dissipation through the heat exchange module or the cooling pipe is effective. In case 2, the actual temperature of the power module is lower than the target temperature of the power module, or the actual temperature of the charging gun is lower than the target temperature of the charging gun. In this case, the heat management module may obtain the cooling power of the direct cooling module based on the actual temperature of the power module and the actual temperature of the charging gun in such case, control the direct cooling module to operate at the re-obtained cooling power of the direct cooling module (that is, the direct cooling module operates at a derated power (that is, an output power may be reduced by reducing a rate of a compressor, or the like)), and control the opening degree of the corresponding throttle valve to decrease.

In a possible implementation, the control method provided in this application may further include: when any one of the one or more charging piles is shut down (charging of the terminal device ends, and the charging pile is shut down) or faulty, the heat management module may control the direct cooling module to shut down, and control the throttle valve to be closed.

It should be noted that the foregoing control method provided in this application is not only applicable to a charging system including one charging pile, but also applicable to a charging system including a plurality of charging piles.

It should be understood that, technical solutions in the second aspect and the third aspect of this application are consistent with technical solutions in the first aspect of this application, and beneficial effects achieved by the various aspects and corresponding feasible implementations are similar. Details are not described again.

BRIEF DESCRIPTION OF DRAWINGS

To describe technical solutions in this application or in the conventional technology more clearly, the following briefly describes the accompanying drawings for describing embodiments or the conventional technology. It is clear that, the accompanying drawings in the following descriptions show some embodiments of this application, and a person of ordinary skill in the art may still derive other drawings from these accompanying drawings without creative efforts.

DESCRIPTION OF EMBODIMENTS

Figure 1:
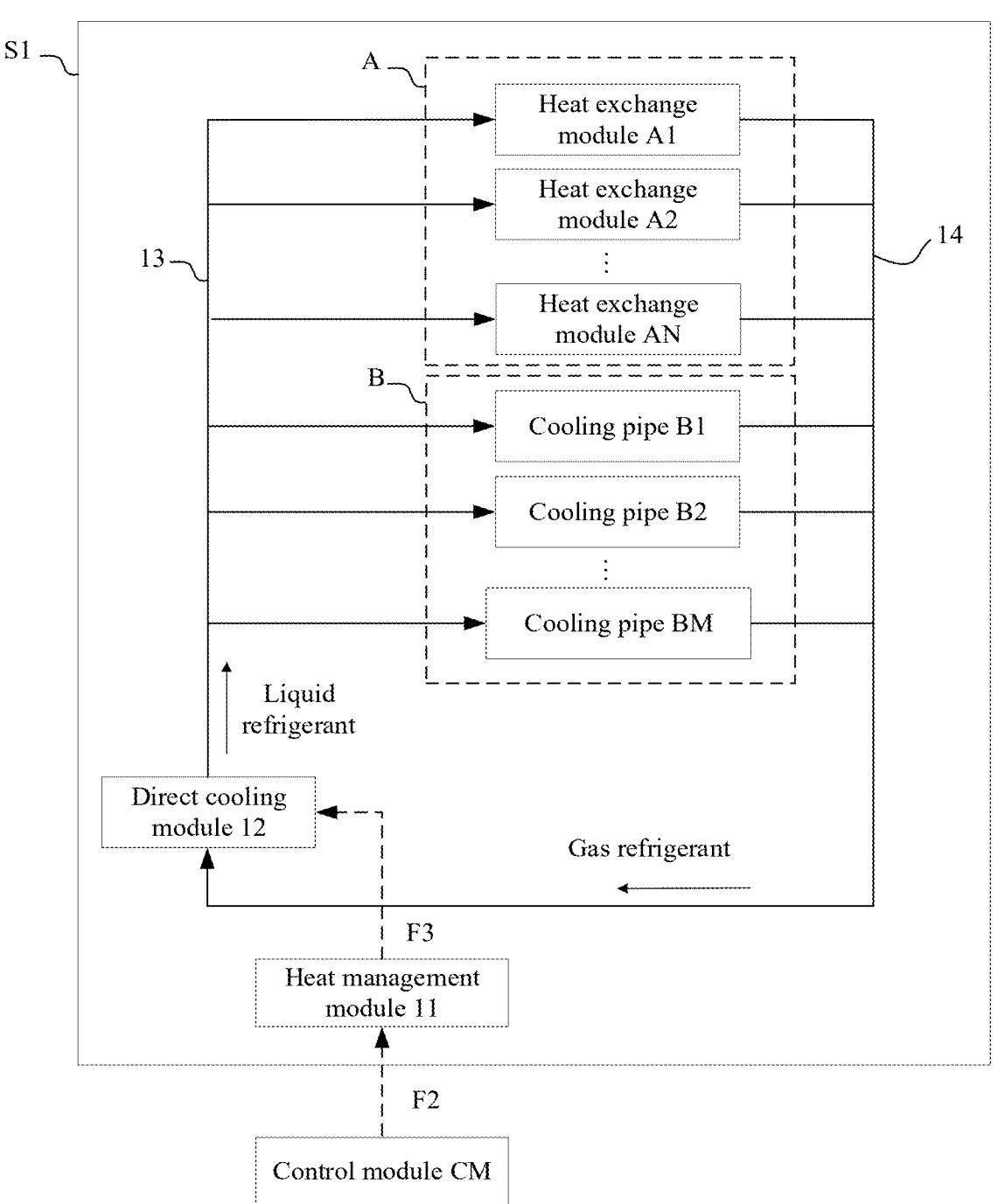
FIG. 1 is a schematic diagram of a structure a refrigerating system according to an embodiment of this application.

The following describes technical solutions of this application with reference to accompanying drawings.

To make the objectives, technical solutions, and advantages of this application clearer, the following clearly describes the technical solutions in this application with reference to the accompanying drawings in this application. It is clear that, the described embodiments are merely some rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. A character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

With vigorous development of the new energy industry, production and sales of terminal devices (such as new energy vehicles) are increasing.

New energy vehicles are generally classified into new energy passenger vehicles (such as battery electric vehicles (BEV) and plug-in hybrid electric vehicles (PHEV)), new energy commercial vehicles (such as electric buses and electric coaches), new energy dedicated vehicles (such as electric heavy trucks, which may be trucks with a total mass greater than 14 tons), electric ferry vehicles, and electric special vehicles (such as electric fire engines)), new energy logistics vehicles (such as electric light truck (which may be a truck with a total mass greater than 1.8 tons and less than or equal to 4.5 tons), an electric medium truck (which may be a truck with a total mass greater than 4.5 tons and less than or equal to 14 tons), an electric mini van (which may be a small truck with a total mass less than or equal to 1.8 tons), and the like.

An electricity amount of a battery pack carried on the new energy passenger vehicle is usually between 50 kWh and 100 kWh, an electricity amount of a battery pack carried on the new energy commercial vehicle is usually between 150 kWh and 300 kWh, an electricity amount of a battery pack carried on the new energy dedicated vehicle is usually between 200 kWh and 500 kWh, and an electricity amount of a battery pack carried on the new energy logistics vehicle is usually between 50 kWh and 200 kWh.

To meet charging requirements of the foregoing different new energy vehicles, shorten charging time, and implement fast charging of the new energy vehicles, a charging pile (or a charging heap or the like) needs to meet high-power charging requirements of the new energy vehicles, that is, the charging pile needs to have a high-power charging capability. For example, a peak power of the charging pile needs to reach 200 kW to 400 kW at most, and a current of a single charging gun needs to reach 250 A for several minutes to more than 10 minutes.

In a process of charging a new energy vehicle, a power module, a charging gun, and a cable between the power module and the charging gun in a charging pile generate a large amount of heat. Therefore, a fan may be used to dissipate heat for the charging pile (that is, heat is dissipated for the charging pile in an air cooling manner). However, the fan usually rotates at a high speed and has large noise. In addition, due to impact of an ambient temperature, the air cooling manner has a poor heat dissipation effect (namely, a cooling effect) on the charging pile. More importantly, the air cooling manner can dissipate heat only for the power module, but not for the cable and charging gun. The air cooling manner has a limited heat dissipation effect on the power module, and the charging pile may operate at a derated power (that is, an output power is reduced) or even terminated. In addition, heat generated by the cable and the charging gun cannot be quickly dissipated. This causes high temperatures of the cable and the charging gun, and accelerates aging speeds of the cable and the charging gun.

To overcome disadvantages of the air cooling manner, a direct cooling manner and a liquid cooling manner may be used in combination. In other words, a direct cooling module (for example, a compressor, for which a refrigerant needs to be used) and a liquid cooling module (for example, a liquid reservoir, for which a coolant needs to be used) are used to dissipate heat for the charging pile. Consumption of coolant (such as glycol) is large and is prone to leakage, which may cause accidents such as a short circuit of the charging pile. In addition, heat exchange needs to be performed between the direct cooling module and the liquid cooling module, and then heat exchange is performed between the liquid cooling module and the charging pile (namely, the direct cooling device). In other words, in the entire process, heat exchange needs to be performed twice. Therefore, both a heat exchange coefficient and a cooling effect of the charging pile are poor. In addition, heat exchange is performed using the refrigerant, which causes a low cooling rate (namely, a heat dissipation rate).

To improve a heat exchange coefficient of a charging pile, improve a cooling effect of the charging pile, implement fast heat dissipation of the charging pile, and ensure safety of the charging pile, an embodiment of this application provides a refrigerating system, as shown in FIG. 1. In FIG. 1, the refrigerating system S1 may include a heat management module 11, a direct cooling module 12, N heat exchange modules A (namely, a heat exchange module A1, a heat exchange module A2, . . . , and a heat exchange module AN in FIG. 1), and M cooling pipes B (namely, a cooling pipe B1, a cooling pipe B2, . . . , and a cooling pipe BM in FIG. 1). In FIG. 1, dashed lines with arrows represent transmission paths (namely, communication loops) of information (including charging information F2 and control information F3), and solid lines with arrows represent transmission paths (namely, cooling loops) of a refrigerant.

An input end of the heat management module 11 may be configured to connect to a control module (CM, namely, a pile controller) of a charging pile C (as shown by a dashed line arrow in FIG. 1). An output end of the heat management module 11 may be configured to connect to an input end of the direct cooling module 12 (as shown by a dashed line arrow in FIG. 1). An output end of the direct cooling module 12 may be configured to connect to a first end of a first pipe assembly 13 (as shown by a solid line arrow in FIG. 1). Second ends of the first pipe assembly 13 may be configured to connect to input ends of the N heat exchange modules A and input ends of the M cooling pipes (as shown by solid line arrows in FIG. 1). Output ends of the heat exchange modules and output ends of the cooling pipes are configured to separately connect to first ends of a second pipe assembly 14 (as shown by solid line arrows in FIG. 1). A second end of the second pipe assembly 14 may be configured to connect to an input end of the direct cooling module 12 (as shown by a solid line arrow in FIG. 1).

Optionally, each heat exchange module is further connected to a corresponding power module (PM) in the charging pile C (not shown in FIG. 1), and each cooling pipe may be disposed inside a corresponding charging gun in the charging pile C and a cable connected to the charging gun (not shown in FIG. 1).

It should be explained that the heat exchange module may be built in the power module, or fastened outside the power module. Certainly, the heat exchange module and the power module may be connected in another manner. This is not limited in this embodiment of this application.

Based on the foregoing connection relationship, the following may be further obtained:

The heat management module 11 may be configured to send the control information F3 to the direct cooling module 12 based on the charging information F2 from the control module CM (that is, the control module CM may send the charging information F2 to the heat management module 11). The charging information F2 may indicate that the charging pile needs to charge a new energy vehicle.

The direct cooling module 12 may be configured to: convert, based on the control information F3, a gas refrigerant transmitted in the second pipe assembly 14 into a liquid refrigerant, and transmit the liquid refrigerant to each heat exchange module (that is, the heat exchange module A1 to the heat exchange module AN) and each cooling pipe (that is, the cooling pipe B1 to the cooling pipe BM) through the first pipe assembly 13.

Each heat exchange module (for example, the heat exchange module A1) may be configured to dissipate heat for a power module (which may be all power modules in the charging pile, which are not shown in FIG. 1) based on the liquid refrigerant transmitted in the first pipe assembly 13.

Each cooling pipe (for example, the cooling pipe B1) may be configured to dissipate, based on the liquid refrigerant transmitted in the first pipe assembly 13, heat for a charging gun (which may be all charging guns that are currently used in the charging gun, which are not shown in FIG. 1) and a cable (not shown in FIG. 1) connected to the charging gun.

It can be seen from FIG. 1 that the refrigerant forms a loop in the entire refrigerating system. A transmission path of the refrigerant is shown by solid line arrows in FIG. 1: direct cooling module 12→first pipe assembly 13→plurality of heat exchange modules A and the plurality of cooling pipes B→second pipe assembly 14→direct cooling module 12. In other words, the refrigerant is output from the direct cooling module 12 and is transmitted to the plurality of heat exchange modules A and the plurality of cooling pipes B through the first pipe assembly 13; and after flowing through the plurality of heat exchange modules A and the plurality of cooling pipes B, the refrigerant then returns to the direct cooling module 12 through the second pipe assembly 14.

It may be understood that because the heat exchange module is configured to dissipate heat for the power module, and the cooling pipe is configured to dissipate heat for the charging gun and the cable connected to the charging gun, to achieve a better heat dissipation effect, a quantity of heat exchange modules may be equal to a quantity of power modules, and a quantity of cooling pipes may be equal to a quantity of charging guns.

Certainly, a plurality of (for example, two or three) power modules may share one heat exchange module. In other words, one heat exchange module may be fastened outside the plurality of power modules, and the heat exchange module dissipates heat for the plurality of power modules.

For example, the charging pile includes four power modules and two charging guns. Therefore, the refrigerating system may include four heat exchange modules and two cooling pipes.

Optionally, the heat exchange module may use a plate heat exchanger. Certainly, the heat exchange module may alternatively use another type of heat exchanger. This is not limited in this embodiment of this application.

In this embodiment of this application, the heat management module controls the direct cooling module based on the charging information, the heat exchange module directly exchanges heat with the power module, and the cooling pipe directly exchanges heat with the charging gun and the cable. This not only implements heat dissipation through the heat exchange module for the power module (that is, cools the power module), but also implements heat dissipation through the cooling pipe for the charging gun and the cable (that is, cools the charging gun and the cable). In addition, the heat exchange coefficient of the charging pile is improved, the cooling effect of the charging pile is significantly improved, and a heat dissipation speed of the charging pile is accelerated, thereby ensuring safety of the charging pile.

In a possible implementation, the refrigerant (including the liquid refrigerant and the gas refrigerant) uses a phase change refrigerant (for example, a low-temperature environment-friendly refrigerant R134a, which has low conductivity and a boiling point of −26.1° C.). A refrigerant such as R134y may alternatively be used.

The refrigerant in the refrigerating system provided in this embodiment of this application is transmitted along the loop, and a use amount of refrigerants is small and the refrigerant is less likely to leak. In addition, even if the refrigerant leaks, the refrigerant will evaporate quickly, which is less likely to affect insulation performance of the refrigerating system or cause short circuit.

Figure 2:
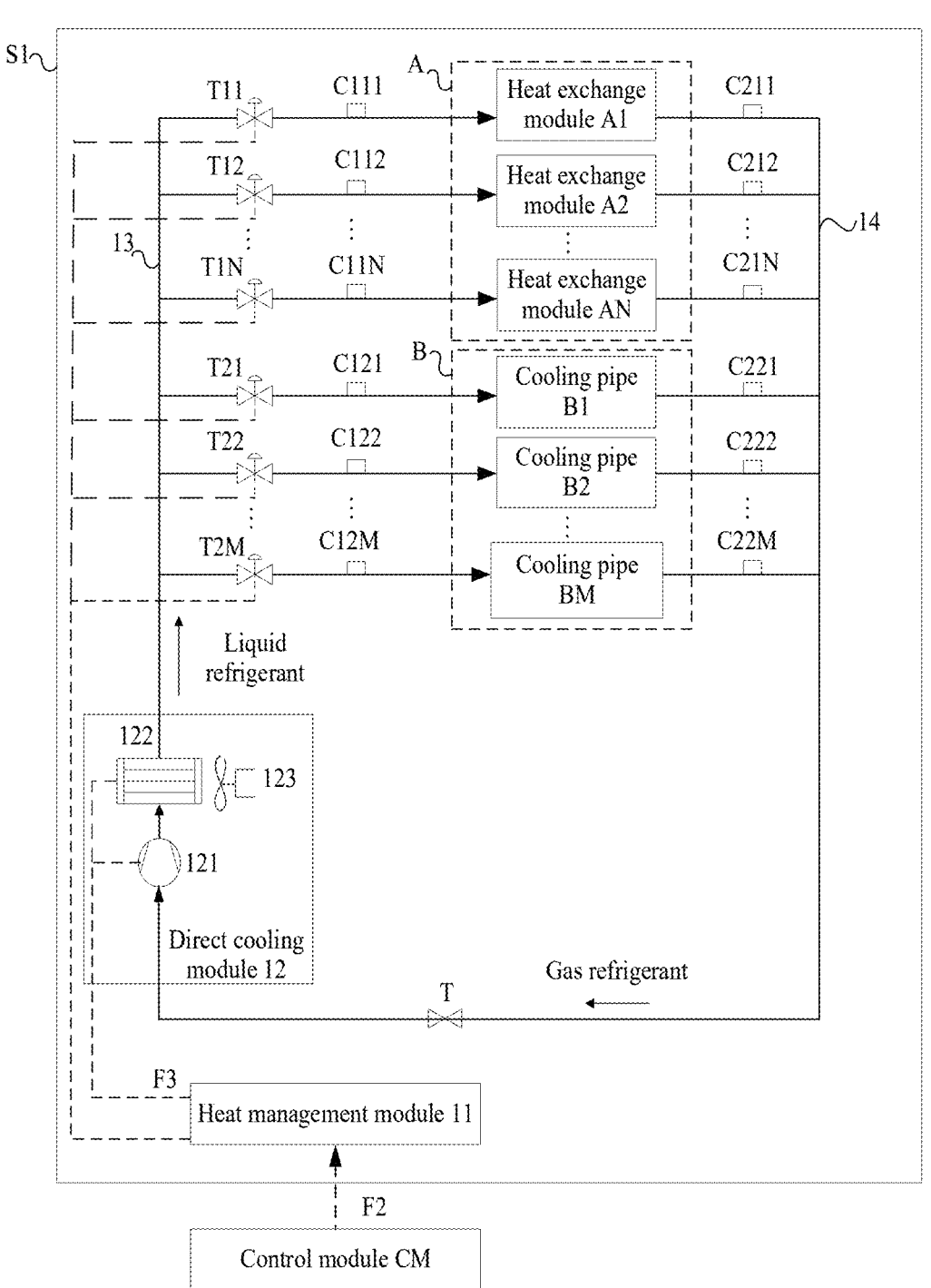
FIG. 2 is a schematic diagram of a structure a refrigerating system according to an embodiment of this application.

Further, as shown in FIG. 2, the direct cooling module 12 may include a compressor 121, a condenser 122, and a fan 123. In FIG. 2, dashed lines with arrows represent transmission paths (namely, communication loops) of information (including charging information F2 and control information F3), and solid lines with arrows represent transmission paths (namely, cooling loops) of a refrigerant. An input end of the compressor 121 may be connected to an output end of the heat management module 11 (as shown by a dashed arrow in FIG. 2). An input end of the compressor 121 may further be connected to the second pipe assembly 14 (as shown by a solid arrow in FIG. 2). An output end of the compressor 121 may be connected to an input end of the condenser 122 (as shown by a solid arrow in FIG. 2). An input end of the condenser 122 may further be connected to the output end of the heat management module 11 (as shown by a dashed arrow in FIG. 2). An output end of the condenser 122 may be connected to the first pipe assembly 13 (as shown by a solid line arrow in FIG. 2).

Based on the foregoing connection relationship, the following may be further obtained:

The compressor 121 may be configured to: compress, based on the control information F3, the gas refrigerant transmitted in the second pipe assembly 14, and transmit the compressed gas refrigerant to the condenser 122. In other words, the compressor 121 is controlled by the heat management module 11. Under the control of the heat management module 11, the compressor 121 is started to compress the gas refrigerant transmitted in the second pipe assembly 14, and transmit the compressed gas refrigerant to the condenser 122.

The condenser 122 may be configured to: convert, based on the control information F3, the compressed gas refrigerant into a liquid refrigerant, and transmit the liquid refrigerant to each heat exchange module (that is, the heat exchange module A1 to the heat exchange module AN) and each cooling pipe (that is, the cooling pipe B1 to the cooling pipe BM) through the first pipe assembly 13. In other words, the condenser 122 is controlled by the heat management module 11. Under the control of the heat management module 11, the condenser 122 is started to convert the compressed gas refrigerant into the liquid refrigerant. Then, the liquid refrigerant is transmitted to each heat exchange module and each cooling pipe through the first pipe assembly 13.

The fan 123 may be configured to dissipate heat for the condenser 122, so as to improve running efficiency of the condenser 122.

In this embodiment of this application, the compressor and the condenser convert, under control of the control module, the gas refrigerant transmitted in the second pipe assembly into the liquid refrigerant, to implement a phase change of the refrigerant, so that the heat exchange module can dissipate heat for the power module, and the cooling pipe can dissipate heat for the charging gun and the cable connected to the charging gun.

In an example, the direct cooling module 12 may further include a case body. The compressor 121, the condenser 122, and the fan 123 are all disposed inside the case body. A side wall of the case body is provided with a heat dissipation hole.

In this embodiment of this application, only the direct cooling module is provided with a fan and a heat dissipation hole, and no fan or heat dissipation hole is provided in the charging pile. This improves an IP (ingress protection) protection level of the charging pile.

In a possible implementation, the first pipe assembly 13 may include a first primary pipe (namely, a pipe in a vertical direction on the left of the heat exchange modules and the cooling pipes in FIG. 2) and (N+M) first secondary pipes (namely, pipes in a horizontal direction on the left of the heat exchange modules and the cooling pipes in FIG. 2).

The (N+M) first secondary pipes include N first secondary pipes (namely, a first part of first secondary pipes, that is, N first secondary pipes between the first primary pipe and the N heat exchange modules) connected to the N heat exchange modules and M first secondary pipes (namely, a second part of first secondary pipes, that is, M first secondary pipes between the first primary pipe and the M cooling pipes) connected to the cooling pipes.

Optionally, the N first secondary pipes are connected to the N heat exchange modules in a one-to-one correspondence. In other words, a $1^{st}$ first secondary pipe in the N first secondary pipes is correspondingly connected to a $1^{st}$ heat exchange module (namely, the heat exchange module A1 in FIG. 2) in the N heat exchange modules, and a $2^{nd}$ first secondary pipe in the N first secondary pipes is correspondingly connected to a $2^{nd}$ heat exchange module (namely, the heat exchange module A2 in FIG. 2) in the N heat exchange modules. By analogy, a last (that is, an $N^{th}$) first secondary pipe in the N first secondary pipes is correspondingly connected to a last (that is, an $N^{th}$) heat exchange module (namely, the heat exchange module AN in FIG. 2) in the N heat exchange modules.

Similarly, the M first secondary pipes are connected to the M cooling pipes in a one-to-one correspondence. In other words, a $1^{st}$ first secondary pipe in the M first secondary pipes is correspondingly connected to a 1st cooling pipe (namely, the cooling pipe B1 in FIG. 2) in the M cooling pipes, and a $2^{nd}$ first secondary pipe in the M first secondary pipes is correspondingly connected to a $2^{nd}$ cooling pipe (namely, the cooling pipe B2 in FIG. 2) in the M cooling pipes. By analogy, a last (that is, an $M^{th}$) first secondary pipe in the M first secondary pipes is correspondingly connected to a last cooling pipe (namely, the cooling pipe BM in FIG. 2) in the M cooling pipes.

Further, a first end (namely, a lower end of the first primary pipe in FIG. 2) of the first primary pipe may be configured to connect to the output end of the condenser 122, and second ends (namely, (N+M) second ends) of the first primary pipe may be configured to connect to first ends (that is, left ends of the N first secondary pipes in FIG. 2) of the N first secondary pipes and first ends of the M first secondary pipes (that is, left ends of the M first secondary pipes in FIG. 2). A second end (namely, a right end of each of the N first secondary pipes in FIG. 2) of a first secondary pipe in the N first secondary pipes may be configured to correspondingly connect to one of the N heat exchange modules (for example, a second end of a $1^{st}$ first secondary pipe in the N first secondary pipes may be correspondingly connected to an input end of a $1^{st}$ heat exchange module (namely, the heat exchange module A1) in the N heat exchange modules). A second end (namely, a right end of each of the M second secondary pipes in FIG. 2) of a first secondary pipe in the M first secondary pipes may be configured to correspondingly connect to one of the M cooling pipes (for example, a second end of a $1^{st}$ first secondary pipe in the M first secondary pipes may be correspondingly connected to an input end of a $1^{st}$ first cooling pipe (namely, the cooling pipe B1) in the M cooling pipes).

In a possible implementation, a throttle valve (which may also be referred to as an expansion valve) may be disposed on each of the (N+M) first secondary pipes. The throttle valve may be configured to adjust a flow rate of a liquid refrigerant transmitted in each first secondary pipe.

For example, a throttle valve T11 may be disposed on the 1st first secondary pipe in the N first secondary pipes.

For another example, a throttle valve T12 may be disposed on a $2^{nd}$ first secondary pipe in the N first secondary pipes.

For still another example, a throttle valve TiN may be disposed on a last first secondary pipe in the N first secondary pipes.

For yet another example, a throttle valve T21 may be disposed on the $1^{st}$ first secondary pipe in the M first secondary pipes.

For still yet another example, a throttle valve T22 may be disposed on a $2^{nd}$ first secondary pipe in the M first secondary pipes.

For a further example, a throttle valve T2M may be disposed on a last first secondary pipe in the M first secondary pipes.

It can be understood from the foregoing descriptions and an operating principle of the throttle valve that, the refrigerant (namely, the refrigerant entering the heat exchange module and the cooling pipe) output from the throttle valve is a low-temperature and low-pressure liquid refrigerant. The heat exchange module dissipates heat for the power module based on the low-temperature and low-pressure liquid refrigerant, and the cooling pipe dissipates heat for the charging gun and the cable based on the low-temperature and low-pressure liquid refrigerant. Then, the low-temperature and low-pressure liquid refrigerant returns to the compressor through the second pipe assembly. The compressor compresses the low-temperature and low-pressure liquid refrigerant to obtain a high-temperature and high-pressure gas refrigerant. The high-temperature and high-pressure gas refrigerant enters the condenser, and the condenser may output a medium-temperature and high-pressure liquid refrigerant. The medium-temperature and high-pressure liquid refrigerant enters the throttle valve. The throttle valve may reduce a pressure of the medium-temperature and high-pressure liquid refrigerant. At this time, the medium-temperature and high-pressure liquid refrigerant expands in volume, so that a low-temperature and low-pressure liquid refrigerant (namely, a refrigerant that enters the heat exchange module and the cooling pipe) is obtained.

It should be noted that the foregoing low temperature, medium temperature, high temperature, low voltage, and high voltage are all relative, and are not absolute low temperature, medium temperature, high temperature, low voltage, and high voltage.

For example, the compressor is used as a reference. A temperature of a refrigerant input into the compressor is lower than a temperature of a refrigerant output by the compressor, and a pressure of a refrigerant input into the compressor is lower than a pressure of the refrigerant output by the compressor. It may be obtained with reference to an operating principle of the compressor that refrigerants (namely, refrigerants transmitted in the second pipe assembly from the heat exchange module and the cooling pipe) input into the compressor may be low-temperature and low-pressure liquid refrigerants, and refrigerants output by the compressor may be high-temperature and high-pressure liquid refrigerants.

It should be noted that, a boiling point of the refrigerant is generally lower than 0° C., and the low-temperature and low-pressure liquid refrigerant output by the throttle valve is transmitted to the heat exchange module and the cooling pipe through the first pipe assembly. In a process in which the heat exchange module dissipates heat for the power module and the cooling pipe dissipates heat for the charging gun and the cable, the liquid refrigerant becomes a gas refrigerant due to heat absorption (that is, the refrigerants output by the heat exchange module and the cooling pipe to the compressor through the second pipe assembly is low-temperature and low-pressure gas refrigerants).

For another example, the condenser is used as a reference. A temperature of a refrigerant (namely, the refrigerant output by the compressor) input into the condenser is higher than the temperature of the refrigerant output by the condenser, and a pressure of the refrigerant input into the condenser is basically the same as the pressure of the refrigerant output by the compressor. It may be learned with reference to the operating principle of the condenser that the refrigerant output by the condenser may be a medium-temperature and high-pressure liquid refrigerant.

For still another example, the throttle valve is used as a reference. A temperature of a refrigerant (namely, the refrigerant output by the condenser) input into the throttle valve is higher than a temperature of the refrigerant output by the throttle valve, and a pressure of the refrigerant input into the throttle valve is higher than a pressure of the refrigerant output by the throttle valve. Therefore, the refrigerant input into the throttle valve may be a medium-temperature and high-pressure liquid refrigerant, and the refrigerant output by the throttle valve may be a low-temperature and low-pressure liquid refrigerant.

In a possible implementation, the second pipe assembly may include a second primary pipe (namely, a pipe in a vertical direction on the right of the heat exchange module and the cooling pipe in FIG. 2) and (N+M) second secondary pipes (namely, pipes in a horizontal direction on the right of the heat exchange modules and the cooling pipes in FIG. 2).

The (N+M) second secondary pipes include N second secondary pipes (namely, a first part of second secondary pipes, that is, N second secondary pipes between the second primary pipe and the N heat exchange modules) connected to the N heat exchange modules and M second secondary pipes (namely, a second part of second secondary pipes, that is, M second secondary pipes between the second primary pipe and the M cooling pipes) connected to the cooling pipes.

Optionally, the N second secondary pipes are in a one-to-one correspondence with the N heat exchange modules.

For example, a first end (namely, a left end of a $1^{st}$ second secondary pipe in the N second secondary pipes in FIG. 2) of a $1^{st}$ second secondary pipe in the N second secondary pipes corresponds to a $1^{st}$ heat exchange module (namely, the heat exchange module A1 in FIG. 2) in the N heat exchange modules.

For another example, a first end (namely, a left end of a $2^{nd}$ second secondary pipe in the N second secondary pipes in FIG. 2) of a $2^{nd}$ second secondary pipe in the N second secondary pipes corresponds to a $2^{nd}$ heat exchange module (namely, the heat exchange module A2 in FIG. 2) in the N heat exchange modules.

For still another example, a first end (namely, a left end of a last second secondary pipe in the N second secondary pipes in FIG. 2) of an $N^{th}$ (that is, a last) second secondary pipe in the N second secondary pipes corresponds to an $N^{th}$ (that is, a last) heat exchange module (namely, the heat exchange module AN in FIG. 2) in the N heat exchange modules.

Similarly, the M second secondary pipes are in a one-to-one correspondence with the M cooling pipes.

For example, a first end (namely, a left end of a $1^{st}$ second secondary pipe in the M second secondary pipes in FIG. 2) of a $1^{st}$ second secondary pipe in the M second secondary pipes corresponds to a 1st cooling pipe (namely, the cooling pipe B1 in FIG. 2) in the M cooling pipes.

For another example, a first end (namely, a left end of a $2^{nd}$ second secondary pipe in the M second secondary pipes in FIG. 2) of a $2^{nd}$ second secondary pipe in the M second secondary pipes corresponds to a $2^{nd}$ cooling pipe (namely, the cooling pipe B2 in FIG. 2) in the M cooling pipes.

For still another example, a first end (namely, a left end of a last second secondary pipe in the M second secondary pipes in FIG. 2) of an $M^{th}$ (that is, a last) second secondary pipe in the M second secondary pipes corresponds to an $M^{th}$ (that is, a last) cooling pipe (namely, the heat cooling pipe BM in FIG. 2) in the M cooling pipes.

Based on the foregoing correspondence, the following may be further obtained:

A first end of a second secondary pipe in the N second secondary pipes may be configured to correspondingly connect to a heat exchange module in the N heat exchange modules (for example, the first end of the $1^{st}$ second secondary pipe in the N second secondary pipes may be configured to correspondingly connect to an output end of the $1^{st}$ heat exchange module (namely, the heat exchange module A1) in the N heat exchange modules).

A first end of a second secondary pipe in the M second secondary pipes may be configured to correspondingly connect to a cooling pipe in the M cooling pipes (for example, the first end of the $1^{st}$ second secondary pipe in the M second secondary pipes may be configured to correspondingly connect to an output end of the $1^{st}$ cooling pipe (namely, the cooling pipe B1) in the M cooling pipes).

Second ends (namely, right ends of the N second secondary pipes in FIG. 2) of the N second secondary pipes and second ends (namely, right ends of the M second secondary pipes in FIG. 2) of the M second secondary pipes are configured to separately connect to first ends (namely, upper ends of the second primary pipe in FIG. 2, where the second primary pipe may have (N+M) first ends) of the second primary pipe. A second end (namely, a lower end of the second primary pipe in FIG. 2) of the second primary pipe may be configured to connect to the input end (namely, the input end of the compressor 121) of the direct cooling module 12.

In this embodiment of this application, refrigerants in the first primary pipe, the second primary pipe, the (N+M) first secondary pipes, and the (N+M) second secondary pipes may be used to implement heat dissipation of the N power modules, the M charging guns, and the cables.

In a possible implementation, first sensors (that is, a first sensor C111, a first sensor C112, . . . , a first sensor C11N, a first sensor C121, a first sensor C122, . . . , and a first sensor C12M in FIG. 2) may be disposed on the first secondary pipes.

Optionally, a first sensor may be configured to collect a temperature of a gas refrigerant transmitted in a first secondary pipe in which the first sensor is located.

For example, the first sensor C111 may be configured to collect a temperature of a gas refrigerant transmitted in a first secondary pipe (that is, the $1^{st}$ first secondary pipe in the N first secondary pipes, namely, a first secondary pipe that is in the N first secondary pipes and that is connected to an input end of the heat exchange module A1) in which the first sensor C111 is located.

For another example, the first sensor C121 may be configured to collect a temperature of a gas refrigerant transmitted in a first secondary pipe (that is, the $1^{st}$ first secondary pipe in the M first secondary pipes, namely, a first secondary pipe that is in the M first secondary pipes and that is connected to an input end of the cooling pipe B1) in which the first sensor C121 is located.

Similarly, second sensors (that is, a second sensor C211, a second sensor C212, . . . a second sensor C21N, a second sensor C221, a second sensor C222, . . . , and a second sensor C22M in FIG. 2) may be disposed on the second secondary pipes.

Optionally, a second sensor may be configured to collect a temperature of a gas refrigerant transmitted in the second secondary pipe in which the second sensor is located.

For example, the second sensor C211 may be configured to collect a temperature of a gas refrigerant transmitted in a second secondary pipe (that is, the $1^{st}$ second secondary pipe in the N second secondary pipes, namely, a second secondary pipe that is in the N second secondary pipes and that is connected to an output end of the heat exchange module A1) in which the second sensor C211 is located.

For another example, the second sensor C221 may be configured to collect a temperature of a gas refrigerant transmitted in a second secondary pipe (that is, the $1^{st}$ second secondary pipe in the M second secondary pipes, namely, a second secondary pipe that is in the M second secondary pipes and that is connected to an output end of the cooling pipe B1) in which the second sensor C221 is located.

In a possible implementation, a third sensor may be disposed on each power module. The third sensor may be configured to collect an actual temperature (which may be represented by $T_{PM}$) of a power module in which the third sensor is located.

Similarly, a fourth sensor may be disposed on each charging gun. The fourth sensor may be configured to collect an actual temperature (which may be represented by $T_{CP}$) of a charging gun in which the fourth sensor is located.

Optionally, a fifth sensor may be disposed on an outer surface of the charging pile. The fifth sensor may be configured to collect an ambient temperature (which may be represented by $T_E$) of the charging pile.

In a possible implementation, the heat management module 11 may receive the charging information F2 from the control module CM, and may obtain (from the fifth sensor) the ambient temperature $T_E$ of the charging pile, the actual temperature $T_{PM}$ of the power module (from the third sensor), and the actual temperature $T_{CP}$ of the charging gun (from the fourth sensor).

It is assumed that the actual temperature $T_{PM}$ of the power module is higher than a preset first temperature upper limit (which may be represented by $T_{MAX1}$) for preset first duration (which is represented by $T_{SET1}$, and $T_{SET1}$ may be 10 seconds) (which indicates that the power module needs to be cooled). Alternatively, it is assumed that the actual temperature $T_{CP}$ of the charging gun is higher than a preset second temperature upper limit (which may be represented by $T_{MAX2}$) for preset second duration (which may be represented by $T_{SET2}$, and $T_{SET2}$ may also be 10 seconds), (which indicates that the charging gun needs to be cooled). In these cases, the heat management module 11 may obtain a cooling power (which may be represented by P) of the direct cooling module 12 based on the charging information F2, the ambient temperature $T_E$ of the charging pile, the actual temperature $T_{PM}$ of the power module, and the actual temperature $T_{CP}$ of the charging gun.

It should be noted that, generally, provided that the control module CM sends the charging information F2 to the heat management module 11, it indicates that a new energy vehicle needs to be charged. There are three cases below:

Case 1: Only the actual temperature $T_{PM}$ of the power module is higher than the preset first temperature upper limit $T_{MAX1}$ for the preset first duration $T_{SET1}$ (that is, the actual temperature $T_{PM}$ of the power module is higher than the preset first temperature upper limit $T_{MAX1}$ for the preset first duration $T_{SET1}$, and the actual temperature $T_{CP}$ of the charging gun is lower than or equal to the preset second temperature upper limit $T_{MAX2}$). In case 1, the heat management module 11 needs to obtain the cooling power P of the direct cooling module 12 based on the ambient temperature $T_E$ of the charging pile and the actual temperature $T_{PM}$ of the power module.

Case 2: Only the actual temperature $T_{CP}$ of the charging gun is higher than the preset second temperature upper limit $T_{MAX2}$ for the preset second duration $T_{SET2}$ (that is, the actual temperature $T_{CP}$ of the charging gun is higher than the preset second temperature upper limit $T_{MAX2}$ for the preset second duration $T_{SET2}$, and the actual temperature $T_{PM}$ of the power module is lower than or equal to the preset first temperature upper limit $T_{MAX1}$). In case 2, the heat management module 11 needs to obtain the cooling power P of the direct cooling module 12 based on the ambient temperature $T_E$ of the charging pile and the actual temperature $T_{CP}$ of the charging gun.

Case 3: The actual temperature $T_{PM}$ of the power module is higher than the preset first temperature upper limit $T_{MAX1}$ for the preset first duration $T_{SET1}$, and the actual temperature $T_{CP}$ of the charging gun is higher than the preset second temperature upper limit $T_{MAX2}$ for the preset second duration $T_{SET2}$. In case 3, the heat management module 11 needs to obtain the cooling power P of the direct cooling module 12 based on the ambient temperature $T_E$ of the charging pile, the actual temperature $T_{PM}$ of the power module, and the actual temperature $T_{CP}$ of the charging gun.

Further, the heat management module 11 may deliver the cooling power P of the direct cooling module 12 as the control information F3 to the direct cooling module 12, and control the throttle valves (that is, the throttle valve T11 to the throttle valve TiN and the throttle valve T21 to the throttle valve T2M in FIG. 2) to open.

It should be noted that when the actual temperature $T_{PM}$ of the power module is less than or equal to the preset first temperature upper limit $T_{MAX1}$, and the actual temperature $T_{CP}$ of the charging gun is less than or equal to the preset second temperature upper limit $T_{MAX2}$, the direct cooling module 12 does not need to be started. Therefore, the management module 11 does not need to deliver the control information F3 to the direct cooling module 12. In addition, the throttle valve T11 to the throttle valve TiN and the throttle valve T21 to the throttle valve T2M are in a closed state.

Further, the heat management module 11 may obtain, based on the charging information F2, the ambient temperature $T_E$ of the charging pile, and the actual temperature $T_{PM}$ of the power module, a cooling power (which may be represented by $P_{PM}$) required for reducing the actual temperature $T_{PM}$ of the power module to a target temperature (which may be represented by $T_{TPM}$) of the power module.

In a possible implementation, the heat management module 11 may obtain a heat loss (which may be represented by $P_{LPM}$) of the power module based on an input power (which may be represented by $P_{in}$) of the power module and conversion efficiency (which may be represented by η, where the conversion efficiency f may include rectification efficiency, chopping efficiency, power correction efficiency, filtering efficiency, and the like of the power module) of the power module.

For example, when the input power $P_{in}$ of the power module is 100 kW and the conversion efficiency η is 95%, the remaining 5% is the heat loss of the power module, which is mainly dissipated in a form of heat. In other words, the heat loss of the power module is 5 kW.

Further, the heat management module 11 may obtain, based on the charging information F2, the ambient temperature $T_E$ of the charging pile, the actual temperature $T_{PM}$ of the power module, the preset target temperature $T_{TPM}$ of the power module, the heat loss $P_{LPM}$ of the power module, and a first correspondence, the cooling power $P_{PM}$ required for reducing the actual temperature $T_{CP}$ of the power module to the target temperature $T_{TPM}$ of the power module.

The first correspondence may indicate a correspondence between the cooling power required for reducing the actual temperature of the power module to the target temperature of the power module, and the ambient temperature of the charging pile, the actual temperature of the power module, the target temperature of the power module, and the heat loss of the power module. The first correspondence may be obtained from a manufacturer of the charging pile. In addition, the first correspondence may be represented in a form of a curve, or may be represented in a form of a table. This is not limited in this embodiment of this application.

Similarly, the heat management module 11 may obtain, based on the charging information F2, the ambient temperature $T_E$ of the charging pile, and the actual temperature $T_{CP}$ of the charging gun, a cooling power (which may be represented by $P_{CP}$) required for reducing the actual temperature $T_{CP}$ of the charging gun to a target temperature (which may be represented by $T_{TCP}$) of the charging gun.

In a possible implementation, the heat management module 11 may obtain a heat loss (which may be represented by $P_{LCP}$) of the charging gun based on a current (which may be represented by I) and impedance (which may be represented by R) of the charging gun by using Ohm's law. In other words, $P_{LCP}=I_2R$ is met.

Further, the heat management module 11 may obtain, based on the charging information F2, the ambient temperature $T_E$ of the charging pile, the actual temperature $T_{CP}$ of the charging gun, the preset target temperature $T_{TCP}$ of the charging gun, the heat loss $P_{LCP}$ of the charging gun, and a second correspondence, the cooling power $P_{CP}$ required for reducing the actual temperature $T_{CP}$ of the charging gun to the target temperature $T_{TCP}$ of the charging gun.

The second correspondence may indicate a correspondence between the cooling power required for reducing the actual temperature of the charging gun to the target temperature of the charging gun, and the ambient temperature of the charging pile, the actual temperature of the charging gun, the target temperature of the charging gun, and the heat loss of the charging gun. The second correspondence may be obtained from the manufacturer of the charging pile. In addition, the second correspondence may be represented in a form of a curve, or may be represented in a form of a table. This is not limited in this embodiment of this application.

Further, the heat management module 11 may add the cooling power $P_{PM}$ required for reducing the actual temperature $T_{CP}$ of the power module to the target temperature $T_{TPM}$ of the power module and the cooling power $P_{CP}$ required for reducing the actual temperature $T_{CP}$ of the charging gun to the target temperature $T_{TCP}$ of the charging gun, to obtain the cooling power P of the direct cooling module. In other words, that P=PPM+PCP is met.

In an example, the target temperature $T_{TPM}$ of the power module may be lower than or equal to the preset first temperature upper limit $T_{MAX1}$. For example, $T_{TPM}$ may be set to 40° C., and $T_{MAX1}$ may be preset to 60° C.

In another example, the target temperature $T_{TCP}$ of the charging gun may be less than or equal to the preset second temperature upper limit $T_{MAX2}$. For example, $T_{TCP}$ may be set to 50° C., and $T_{MAX2}$ may be preset to 80° C.

In still another example, when the actual temperature $T_{PM}$ of the power module is higher than 60° C. for 10 seconds, and the actual temperature $T_{CP}$ of the charging gun is higher than 80° C. for 10 seconds, the heat management module 11 may obtain, based on the ambient temperature (for example, 25° C.) of the charging pile, the cooling power P of the direct cooling module 12 of 15 kW (which is obtained by adding the cooling power $P_{PM}$ required for reducing the actual temperature $T_{CP}$ of the power module to 40° C. and the cooling power $P_{CP}$ required for reducing the actual temperature $T_{CP}$ of the charging gun to 50° C.)

In a possible implementation, the heat management module 11 may obtain a temperature (which may be represented by $T_1$) of a liquid refrigerant, collected by any first sensor, transmitted in a first secondary pipe in which the first sensor is located, and obtain a temperature (which may be represented by $T_2$) of a gas refrigerant, collected by a second sensor, transmitted in a second secondary pipe (the second secondary pipe and the first secondary pipe are connected to a same heat exchange module or a same cooling pipe) in which the second sensor is located.

Optionally, the heat management module 11 may calculate a temperature difference (which may be represented by $\Delta T$) between a temperature $T_1$ of a liquid refrigerant transmitted in any one of the first secondary pipes and a temperature $T_2$ of a gas refrigerant transmitted in a corresponding second secondary pipe.

Further, the heat management module 11 adjusts an opening degree of a corresponding throttle valve based on the temperature difference $\Delta T$.

For example, when the temperature difference $\Delta T$ is higher than a preset temperature threshold (which may be represented by $\Delta T_{SET}$) (that is, $\Delta T > \Delta T_{SET}$), it indicates that heat dissipation through the heat exchange module or the cooling pipe is not effective. In this case, the heat management module 11 may control the opening degree of the throttle valve to increase.

When the temperature difference $\Delta T$ is less than or equal to the preset temperature threshold, it indicates that heat dissipation through the heat exchange module or the cooling pipe is effective. In this case, the actual temperature of the power module is lower than the target temperature of the power module, or the actual temperature of the charging gun is lower than the target temperature of the charging gun. In this case, the heat management module 11 may obtain the cooling power of the direct cooling module based on the actual temperature of the power module and the actual temperature of the charging gun (refer to the foregoing process) in such case, control the direct cooling module to operate at the re-obtained cooling power of the direct cooling module (that is, the direct cooling module operates at a derated power (that is, an output power may be reduced by reducing a rate of the compressor, or the like)), and control the opening degree of the corresponding throttle valve to decrease.

It should be noted that if any charging gun is in an idle state (that is, no new energy vehicle is charged through the charging gun), the heat management module 11 may control a throttle valve (namely, a throttle valve on a first secondary pipe connected to a cooling pipe in the charging gun) corresponding to the charging gun to be closed (that is, an opening degree of the throttle valve is 0).

Optionally, the heat management module 11 may send corresponding control information F3 (a communication loop corresponding to the control information F3 is shown by dashed lines with arrows in FIG. 2) to the throttle valves to control the throttle valves (that is, control opening degrees of the throttle valves).

In a possible implementation, a valve T may be disposed on the second primary pipe, as shown in FIG. 2. When the charging pile needs to be maintained, the valve T is closed.

In a possible implementation, when the charging pile is shut down or faulty, the control module CM in the charging pile sends the control information F3 (indicates that the charging pile is shut down or faulty) to the heat management module 11. Then, the heat management module 11 may control, based on the control information F3, the direct cooling module 12 to shut down, and control all throttle valves to close.

A heat exchange coefficient (used to represent a heat exchange capability of a direct cooling system) of the direct cooling system provided in this embodiment of this application may reach 3000 $W/(m^2 \cdot K)$ to 25000 $W/(m^2 \cdot K)$, where K represents Kelvin temperature. The direct cooling system has a much better cooling effect than fan cooling and cooling using coolant (that is, liquid cooling methods), and is not affected by an ambient temperature and has a better cooling effect in high-temperature weather in summer.

In addition, compared with cooling using coolant, the refrigerating system provided in this embodiment of this application has a compact structure and is easy to maintain. More importantly, heat dissipation efficiency of the refrigerating system provided in this embodiment of this application may be two to three times higher than heat dissipation efficiency of cooling using coolant, so that heat can be quickly dissipated for the charging pile, and safety of the charging pile can be ensured.

In addition, a quantity and power of charging piles are not limited in this embodiment of this application. In other words, the refrigerating system provided in this embodiment of this application may be used for heat dissipation for one or more charging piles, and may be a high-power charging system including one high-power charging pile or a plurality of charging piles, to meet a charging requirement of a high-power new energy vehicle.

Figure 3:
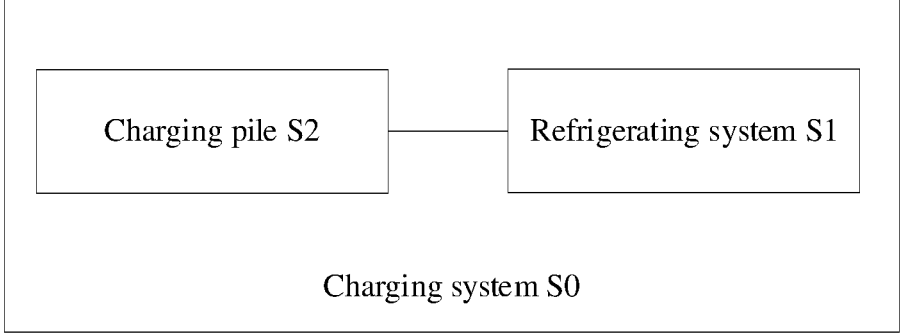
FIG. 3 is a schematic diagram of a structure a charging system according to an embodiment of this application.

An embodiment of this application further provides a charging system S0. As shown in FIG. 3, the charging system S0 may include (one or more) charging piles S2 and the foregoing refrigerating system S1.

Optionally, a control module in the charging pile may be connected to a heat management module in the refrigerating system. The control module sends charging information to the heat management module. One of a plurality of heat exchange modules in the refrigerating system may be connected to a corresponding power module in a plurality of power modules in the charging pile, and the heat exchange module may dissipate heat for the power module.

One of a plurality of cooling pipes in the refrigerating system may be disposed inside a corresponding charging gun in the charging pile, and the cooling pipe may dissipate heat for the corresponding charging gun and a cable connected to the charging gun.

The heat management module in this embodiment of this application may control a direct cooling module. The direct cooling module may convert a gas refrigerant output by the heat exchange module and the cooling pipe into a liquid refrigerant, so that the heat exchange module dissipates heat for the power module based on the liquid refrigerant, and the cooling pipe dissipates heat for the charging gun and the cable connected to the charging gun based on the liquid refrigerant. This not only improves a heat exchange coefficient of the one or more charging piles, but also accelerates a heat dissipation rate of the one or more charging piles. In addition, aging speeds of the power module and the charging gun can be further reduced, thereby improving running reliability of the entire charging system.

In a possible implementation, the charging system S0 includes one charging pile.

Figure 4:
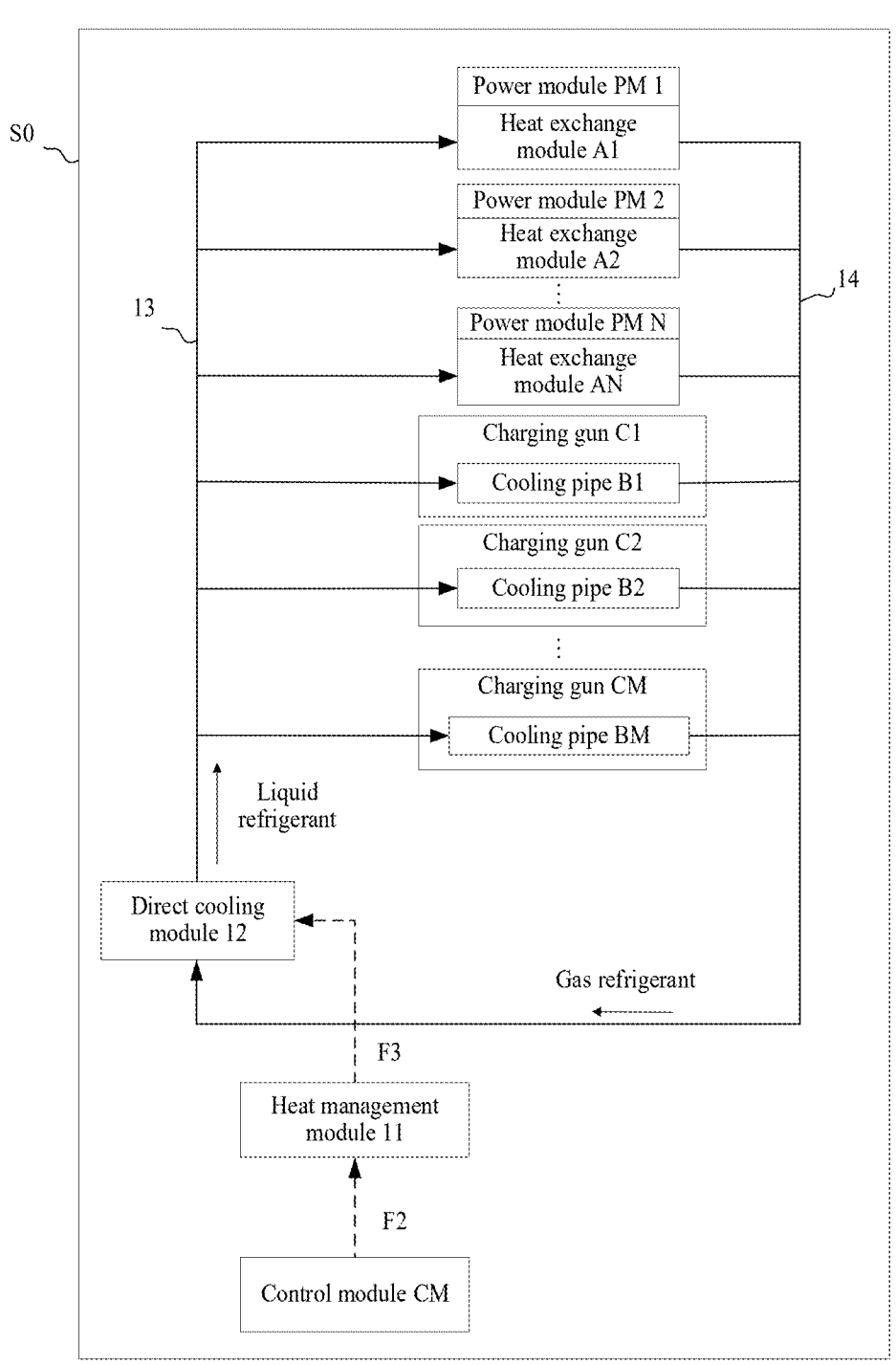
FIG. 4 is a schematic diagram of a structure a charging system according to an embodiment of this application.

As shown in FIG. 4, a control module CM in the charging pile may be connected to a heat management module 11 in the refrigerating system. The control module CM sends charging information F2 to the heat management module 11.

Optionally, the refrigerating system may include a plurality of heat exchange modules (that is, a total of N heat exchange modules in FIG. 4: a heat exchange module A1, a heat exchange module A2, . . . , and a heat exchange module AN), and the charging pile may include a plurality of power modules (that is, a power module PM 1, a power module PM 2, . . . and a power module PM N in FIG. 4).

One heat exchange module may be connected to a corresponding power module, and the heat exchange module is configured to dissipate heat for the power module. For example, the heat exchange module A1 may be connected to the power module PM 1, and the heat exchange module A1 may dissipate heat for the power module PM 1.

Further, the refrigerating system may further include a plurality of cooling pipes (that is, a cooling pipe B1, a cooling pipe B2, . . . , and a cooling pipe BM in FIG. 4), and the charging pile S2 may further include M charging guns in total: a charging gun C1, a charging gun C2, . . . , and a charging gun CM.

One cooling pipe may be disposed inside a corresponding charging gun, and the cooling pipe is configured to dissipate heat for the charging gun and a cable connected to the charging gun. For example, the cooling pipe B1 may be disposed inside the charging gun C1, and the cooling pipe B1 may dissipate heat for the charging gun C1 and a cable connected to the charging gun C1.

In an example, the heat management module 11 may be connected to a control module CM in the charging pile S2, and both the direct cooling module 12 and the heat management module 11 are disposed inside the charging pile.

In other words, both the direct cooling module 12 and the heat management module 11 are disposed inside the charging pile S2. Therefore, the charging pile S2 may be referred to as an integrated pile.

It should be noted that, for detailed descriptions of a throttle valve and the like in the refrigerating system, refer to the foregoing descriptions. Details are not described herein again in this embodiment of this application.

In the charging system provided in this embodiment of this application, the direct cooling module and the heat management module may be located inside the charging pile, to form an integrated pile. In other words, the refrigerating system in this embodiment of this application may be configured to dissipate heat for the integrated pile.

In another possible implementation, the charging system S0 may include K charging piles (that is, a charging pile S21 to a charging pile S2K), and the K charging piles may be connected in parallel.

Figure 5:
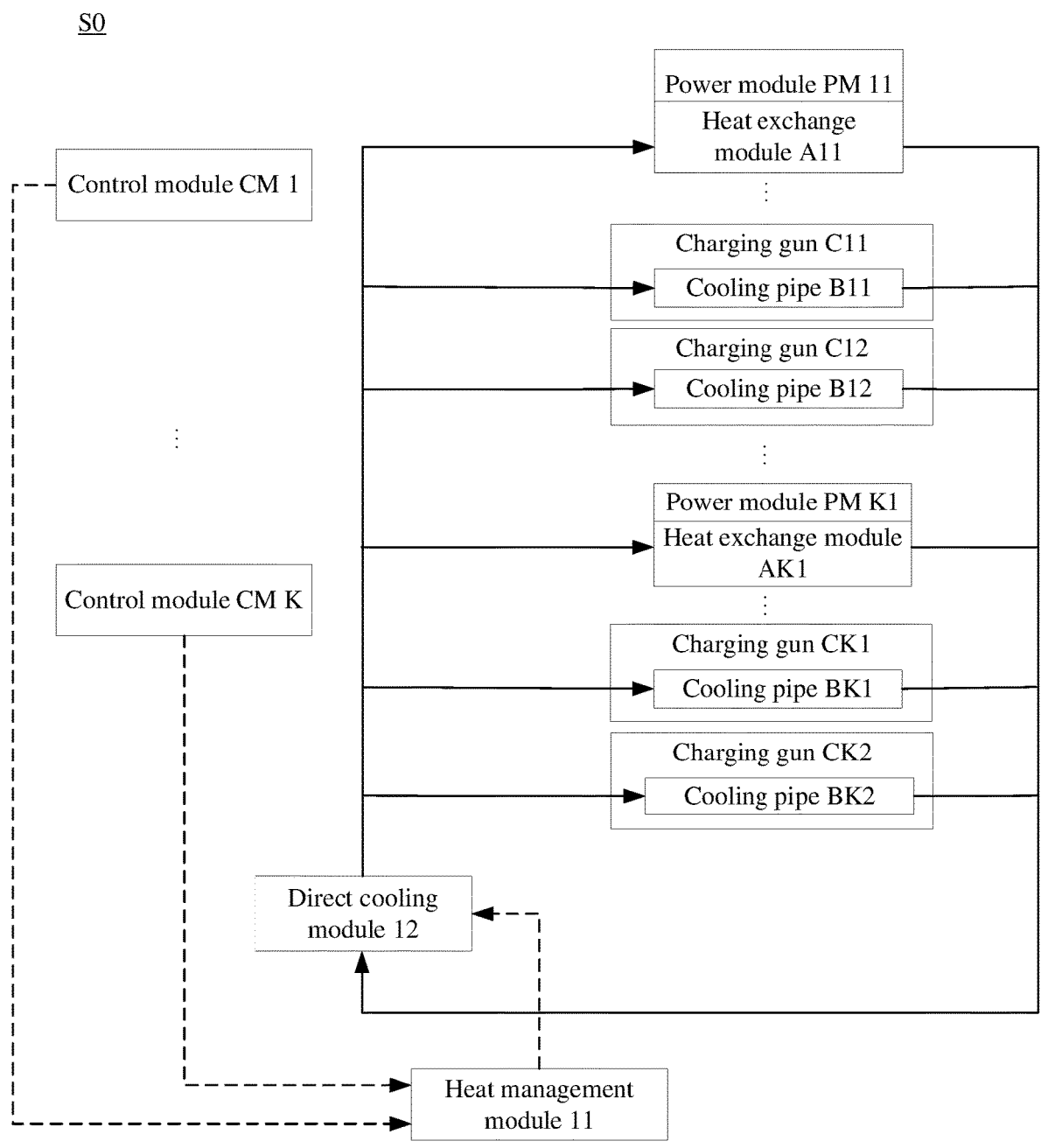
FIG. 5 is a schematic diagram of a structure a charging system according to an embodiment of this application.

As shown in FIG. 5, the heat management module 11 in the refrigerating system is connected to control modules (that is, a control module CM 1 in a 1$^{st}$ charging pile to a control module CM K in a K$^{th}$ charging pile in FIG. 5) of the K charging piles. The control module CM 1 to the control module CM K each need to send control information to the heat management module 11 based on charging information of the control module CM 1 to the control module CM K. Further, the heat management module 11 controls, based on the control information, the direct cooling module 12 to start, so as to implement heat dissipation of the power module and the charging gun in the charging pile.

Optionally, the 1$^{st}$ charging pile may include a plurality of power modules including a power module PM 11 and a plurality of charging guns including a charging gun C11 and a charging gun C12. Correspondingly, the refrigerating system in FIG. 5 may include a plurality of heat exchange modules including a heat exchange module A11 and a plurality of cooling pipes including a cooling pipe B11 and a cooling pipe B12.

Similarly, the K$^{th}$ charging pile may also include a plurality of power modules including a power module PM K1 and a plurality of charging guns including a charging gun CK1 and a charging gun CK2. Correspondingly, the refrigerating system in FIG. 5 may include a plurality of heat exchange modules including a heat exchange module AK1 and a plurality of cooling pipes including a cooling pipe BK1 and a cooling pipe BK2.

In an example, the direct cooling module 12 and the heat management module 11 may be disposed outside the K charging piles. In other words, heat dissipation of the power module and the charging gun in each charging pile can be implemented through one direct cooling module 12 and one heat management module 11. Therefore, the charging system S0 shown in FIG. 5 may be referred to as a charging system including a split-type pile.

Similarly, for detailed descriptions of the throttle valve and the like in the refrigerating system, refer to the foregoing descriptions. Details are not described herein again in this embodiment of this application.

In the charging system provided in this embodiment of this application, the direct cooling modules and the heat management modules are located outside the plurality of charging piles, to form split-type piles. In other words, the refrigerating system in this embodiment of this application may be configured to dissipate heat for the split-type piles.

The split-type pile in this embodiment of this application has a compact structure, so that investment costs and operation and maintenance costs of the charging system can be reduced, and utilization of the direct cooling module can be improved.

Figure 6:
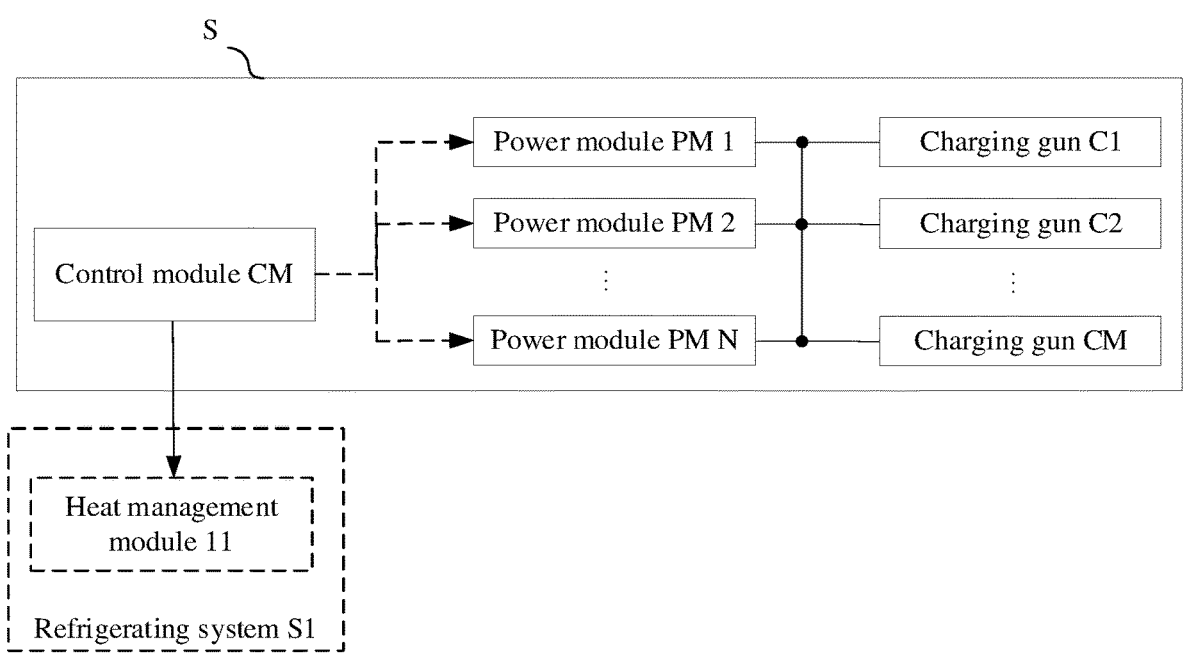
FIG. 6 is a schematic diagram of a structure a charging pile according to an embodiment of this application.

Optionally, as shown in FIG. 6, the charging pile S (namely, the foregoing charging pile S2, the charging pile S21, or the charging pile S2K) may include the control module CM, N power modules PMs (namely, a power module PM 1, a power module PM 2, . . . , and a power module PM N in FIG. 6), and M charging guns (namely, a charging gun C1, a charging gun C2, . . . , and a charging gun CM in FIG. 6). The control module CM may be connected to each of the N power modules PMs, and any one of the N power modules PMs is connected to any one of the M charging guns through a corresponding cable.

Based on the foregoing connection relationship, the following may be further obtained:

The control module CM may be configured to control each power module, and is further configured to send the charging information F2 to the heat management module 11 in the refrigerating system S1.

Each power module may be configured to output, under control of the control module CM, a direct current (that is, V$_{DC\text{-}out}$ in FIG. 6) to any charging gun based on an alternating current (that is, V$_{AC\text{-}in}$ in FIG. 6) provided by an alternating current power supply or a direct current (that is, V$_{DC\text{-}in}$ in FIG. 6) provided by a direct current power supply.

Each charging gun (for example, the charging gun C1) may be configured to charge a new energy vehicle based on a direct current V$_{DC\text{-}out}$ output by any power module.

Figure 7A:
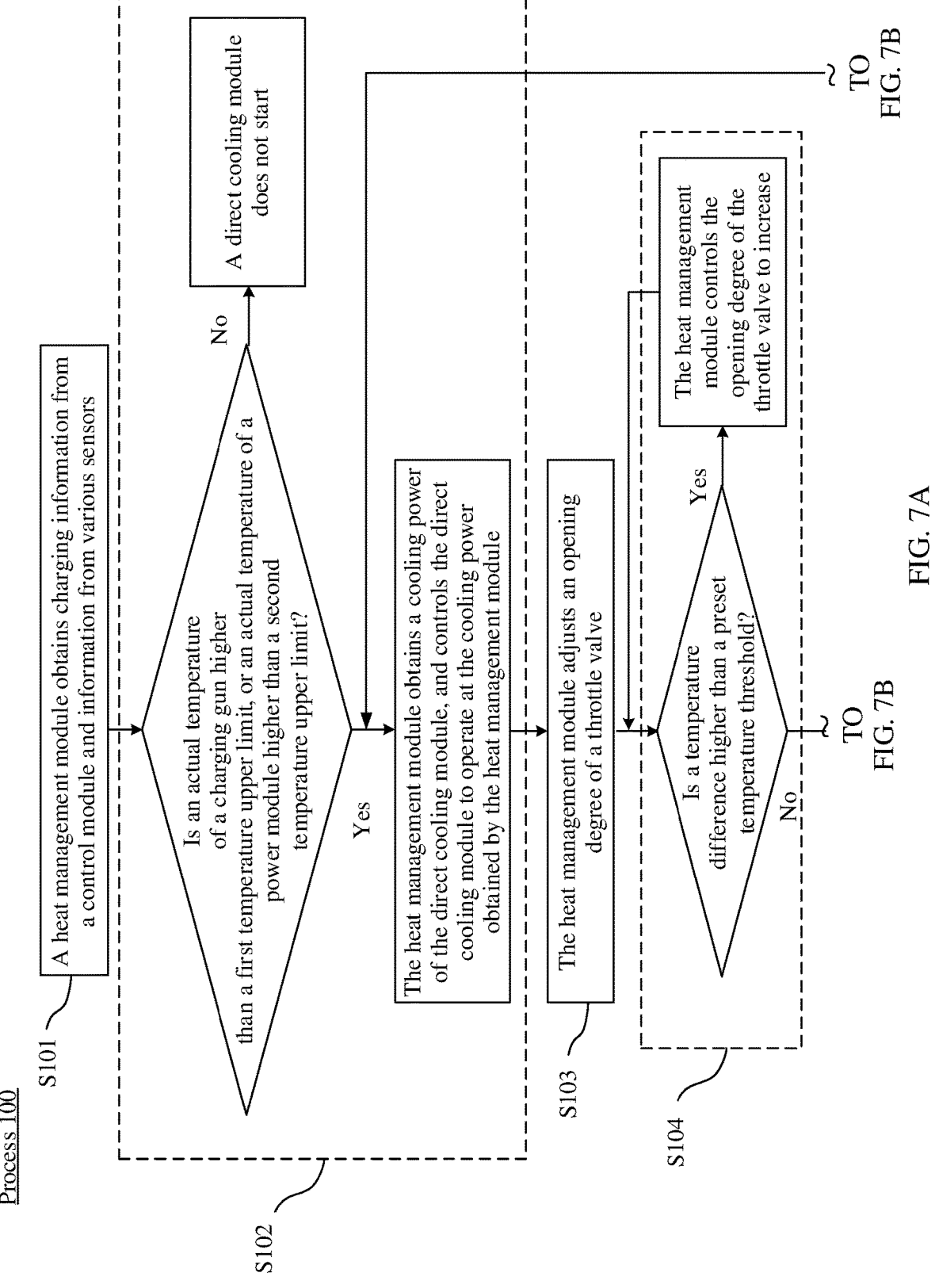
FIG. 7A and FIG. 7B are a schematic flowchart of a method for controlling a charging system according to an embodiment of this application.
Figure 7B:
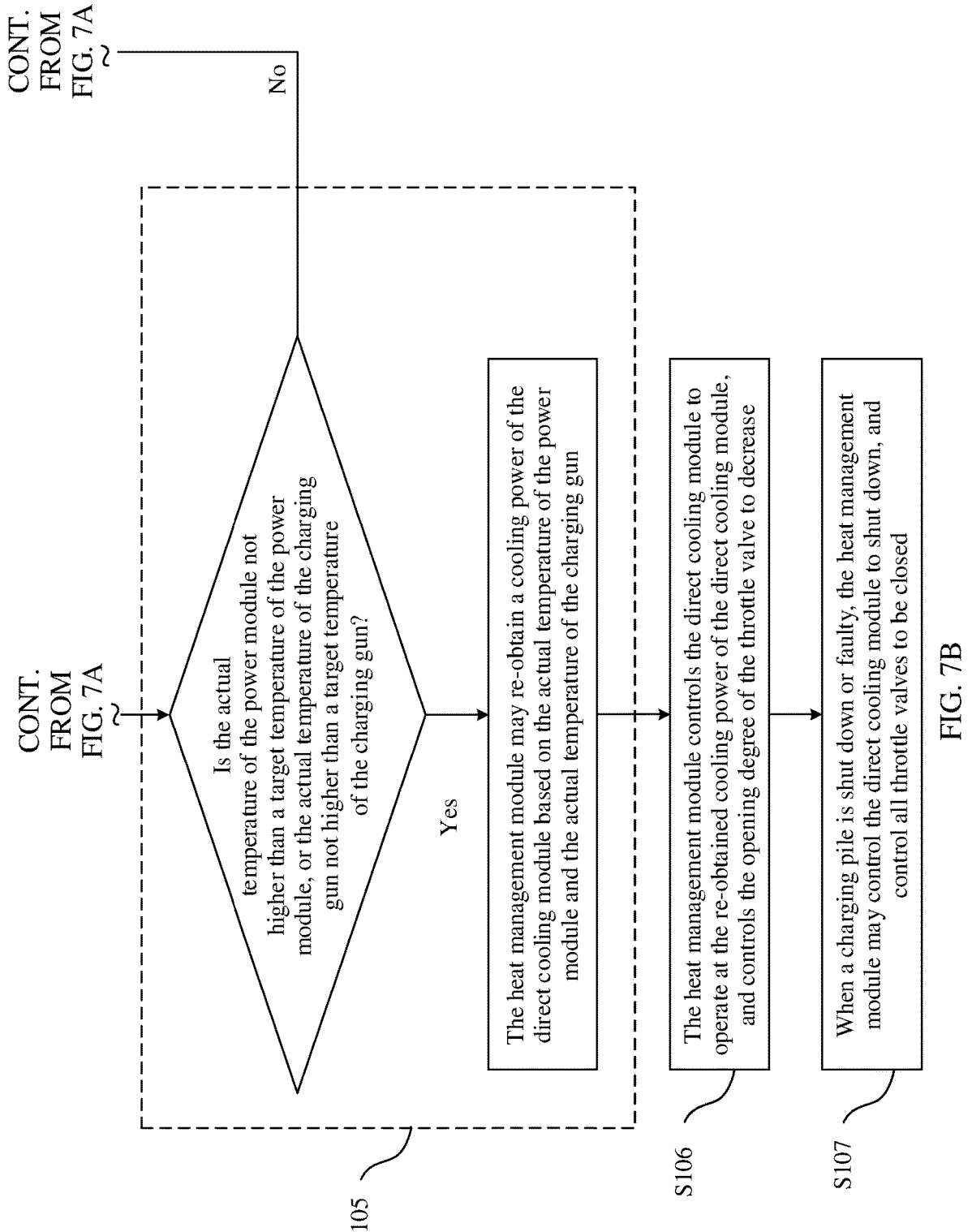

For the charging system including one charging pile shown in FIG. 4, a detailed flowchart of a method for controlling a charging system may be shown in FIG. 7A and FIG. 7B. A process 100 may be implemented according to the following steps:

Step S101: A heat management module obtains charging information (indicates that a charging pile needs to charge a corresponding terminal device, that is, a charging system needs to start operation, and a refrigerating system needs to dissipate heat for the charging pile) from a control module and information from various sensors (including an ambient temperature of a charging pile collected by a fifth sensor, an actual temperature of a power module collected by a third sensor, and an actual temperature of a charging gun collected by a fourth sensor).

Step S102: When the actual temperature of the power module is higher than a preset first temperature upper limit (for example, 60° C.) for preset first duration (for example, 10 seconds), or when the actual temperature of the charging gun is higher than a preset second temperature upper limit (for example, 80° C.) for preset second duration (for example, 10 seconds), the heat management module may obtain a cooling power of the direct cooling module based on the charging information, the ambient temperature of the charging pile, the actual temperature of the power module, and the actual temperature of the charging gun (for a detailed process, refer to the foregoing descriptions); and send the cooling power of the direct cooling module as control information to the direct cooling module, so that the direct cooling module operates at the cooling power sent by the heat management module.

Step S103: The heat management module may adjust an opening degree of a throttle valve based on a temperature difference between a temperature of a liquid refrigerant transmitted in any one of the first secondary pipes and a temperature of a gas refrigerant transmitted in a corresponding second secondary pipe.

Step S104: When the temperature difference is greater than a preset temperature threshold, it indicates that heat dissipation through the heat exchange module or the cooling pipe is not effective. In this case, the heat management module may control the opening degree of the throttle valve to increase. Otherwise (that is, when the temperature difference is less than or equal to the preset temperature threshold), step S105 is performed.

Step S105: When the actual temperature of the power module is not higher than a target temperature of the power module, or when the actual temperature of the charging gun is not higher than a target temperature of the charging gun, the heat management module may re-obtain a cooling power of the direct cooling module based on the actual temperature of the power module and the actual temperature of the charging gun in such case.

Step S106: the heat management module controls the direct cooling module to operate at the re-obtained cooling power of the direct cooling module (that is, the direct cooling module runs at a derated power (that is, an output power may be reduced by reducing a rate of a compressor, or the like)), and controls the opening degree of the corresponding throttle valve to decrease.

Step S107: When the charging pile is shut down or faulty, the heat management module may control the direct cooling module to shut down, and control all throttle valves to be closed.

It should be noted that in step S102, when the actual temperature of the power module is not higher than the first temperature upper limit (for example, 60° C.) and the actual temperature of the charging gun is not higher than the second temperature upper limit, the heat management module does not need to obtain the cooling power of the direct cooling module, and the direct cooling module does not need to be started either.

It should be further noted that in step S105, when the actual temperature of the power module is higher than the target temperature of the power module, or when the actual temperature of the charging gun is higher than the target temperature of the charging gun, the heat management module may obtain the cooling power of the direct cooling module according to step S102.

For the charging system including m charging piles shown in FIG. 5, a method for controlling the charging system is similar to the foregoing control process 100. Differences lie in the following: The heat management module needs to obtain charging information (indicates that at least one charging pile needs to charge a corresponding terminal device, that is, the charging system needs to start to operate, and the refrigerating system needs to dissipate heat for the at least one charging pile) from a control module of the at least one charging pile in the m charging piles.

Further, for the plurality of charging piles, when actual temperatures of one or more power modules in the at least one charging pile are higher than the preset first temperature upper limit (for example, 60° C.) for the preset first duration (for example, 10 seconds), or when actual temperatures of one or more charging guns in the at least one charging pile are higher than the preset second temperature upper limit (for example, 80° C.) for the preset second duration (for example, 10 seconds), the heat management module may obtain the cooling power of the direct cooling module based on charging information of a corresponding control module, an ambient temperature of the charging pile, actual temperatures of the one or more power modules, and actual temperatures of the one or more charging guns (for a detailed process, refer to the foregoing descriptions); and send the cooling power of the direct cooling module as control information to the direct cooling module, so that the direct cooling module operates at the cooling power sent by the heat management module.

It should be further noted that, when an actual temperature of each power module in each charging pile is not higher than a target temperature of the power module and an actual temperature of each charging gun in each charging pile is not higher than a target temperature of the charging gun, the heat management module needs to re-obtain a cooling power of the direct cooling module based on the actual temperature of the power module and the actual temperature of the charging gun, controls the direct cooling module to operate at the re-obtained cooling power of the direct cooling module (that is, the direct cooling module operates at a derated power (that is, an output power may be reduced by reducing a rate of the compressor, or the like)), and controls an opening degree of a corresponding throttle valve to decrease.

The foregoing descriptions are merely specific implementations of this application, and the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A refrigerating system, comprising a heat management circuit, a direct cooling module, a plurality of heat exchange modules, and a plurality of cooling pipes, wherein an input end of the heat management circuit is configured to connect to a control module of a charging pile, an output end of the heat management circuit is configured to connect to an input end of the direct cooling module, an output end of the direct cooling module is configured to connect to a first end of a first pipe assembly, second ends of the first pipe assembly are configured to connect to input ends of the plurality of heat exchange modules and input ends of the plurality of cooling pipes, output ends of the heat exchange modules and output ends of the cooling pipes are configured to separately connect to first ends of a second pipe assembly, a second end of the second pipe assembly is configured to connect to an input end of the direct cooling module, each heat exchange module is further connected to a corresponding power module in the charging pile, and each cooling pipe is disposed inside a corresponding charging gun in the charging pile and a cable connected to the charging gun;

the heat management circuit is configured to send control information to the direct cooling module based on charging information from the control module, wherein the charging information indicates that the charging pile needs to charge a terminal device;

the direct cooling module is configured to: convert, based on the control information, a gas refrigerant transmitted in the second pipe assembly into a liquid refrigerant, and transmit the liquid refrigerant to each heat exchange module and each cooling pipe through the first pipe assembly;

each heat exchange module is configured to dissipate heat for the respective power module by using the liquid refrigerant; and each cooling pipe is configured to dissipate, by using the liquid refrigerant, heat for the respective charging gun and cable connected to the charging gun.

2. The refrigerating system according to claim 1, wherein the direct cooling module comprises a compressor, a condenser, and a fan, wherein an input end of the compressor is connected to the output end of the heat management circuit and the second pipe assembly, an output end of the compressor is connected to an input end of the condenser, an input end of the condenser is further connected to the output end of the heat management circuit, and an output end of the condenser is connected to the first pipe assembly;

the compressor is configured to: compress, based on the control information, the gas refrigerant transmitted in the second pipe assembly, and transmit the compressed gas refrigerant to the condenser;

the condenser is configured to: convert the compressed gas refrigerant into the liquid refrigerant based on the control information, and transmit the liquid refrigerant to each heat exchange module and each cooling pipe through the first pipe assembly; and the fan is configured to dissipate heat for the condenser.

3. The refrigerating system according to claim 2, wherein the first pipe assembly comprises a first primary pipe and a plurality of first secondary pipes;

the plurality of first secondary pipes comprise a first part of first secondary pipes and a second part of first secondary pipes, the first part of first secondary pipes are connected to the plurality of heat exchange modules in a one-to-one correspondence, and the second part of first secondary pipes are connected to the plurality of cooling pipes in a one-to-one correspondence; and a first end of the first primary pipe is configured to connect to the output end of the condenser, second ends of the first primary pipe are configured to connect to first ends of the first part of first secondary pipes and first ends of the second part of first secondary pipes, a second end of a first secondary pipe in the first part of first secondary pipes is configured to correspondingly connect to a heat exchange module in the plurality of heat exchange modules, and a second end of a first secondary pipe in the second part of the first secondary pipes is configured to correspondingly connect to a cooling pipe in the plurality of cooling pipes.

4. The refrigerating system according to claim 3, wherein a throttle valve is disposed on each first secondary pipe; and the throttle valve is configured to adjust a flow rate of the liquid refrigerant transmitted in each first secondary pipe.

5. The refrigerating system according to claim 4, wherein the second pipe assembly comprises a second primary pipe and a plurality of second secondary pipes;

the plurality of second secondary pipes comprise a first part of second secondary pipes and a second part of second secondary pipes, the first part of second secondary pipes are in a one-to-one correspondence with the plurality of heat exchange modules, and the second part of second secondary pipes are in a one-to-one correspondence with the plurality of cooling pipes; and a first end of a second secondary pipe in the first part of second secondary pipes is configured to correspondingly connect to a heat exchange module in the plurality of heat exchange modules, a first end of a second secondary pipe in the second part of second secondary pipes is configured to correspondingly connect to a cooling pipe in the plurality of cooling pipes, second ends of the first part of second secondary pipes and second ends of the second part of second secondary pipes are configured to separately connect to first ends of the second primary pipe, and a second end of the second primary pipe is configured to connect to the input end of the direct cooling module.

6. The refrigerating system of claim 5, wherein the heat management circuit is configured to:

receive the charging information from the control module, and obtain an ambient temperature of the charging pile, an actual temperature of the power module, and the actual temperature of the charging gun;

when the actual temperature of the power module is higher than a preset first temperature upper limit for preset first duration, or when the actual temperature of the charging gun is higher than a preset second temperature upper limit for preset second duration, obtain a cooling power of the direct cooling module based on the charging information, the ambient temperature of the charging pile, the actual temperature of the power module, and the actual temperature of the charging gun; and deliver the cooling power of the direct cooling module as the control information to the direct cooling module, and control the throttle valve to open.

7. The refrigerating system of claim 6, wherein the heat management circuit is configured to:

obtain, based on the charging information, the ambient temperature of the charging pile, and the actual temperature of the power module, a cooling power required for reducing the actual temperature of the power module to a target temperature of the power module;

obtain, based on the charging information, the ambient temperature of the charging pile, and the actual temperature of the charging gun, a cooling power required for reducing the actual temperature of the charging gun to a target temperature of the charging gun; and add the cooling power required for reducing the actual temperature of the power module to the target temperature of the power module and the cooling power required for reducing the actual temperature of the charging gun to the target temperature of the charging gun, to obtain the cooling power of the direct cooling module.

8. The refrigerating system according to claim 7, wherein the target temperature of the power module is lower than or equal to the preset first temperature upper limit; and the target temperature of the charging gun is lower than or equal to the preset second temperature upper limit.

9. The refrigerating system according to claim 7, wherein the heat management circuit is configured to:

obtain a heat loss of the power module based on an input power of the power module and conversion efficiency of the power module; and obtain, based on the charging information, the ambient temperature of the charging pile, the actual temperature of the power module, the target temperature of the power module, the heat loss of the power module, and a first correspondence, the cooling power required for reducing the actual temperature of the power module to the target temperature of the power module, wherein the first correspondence indicates a correspondence between the cooling power required for reducing the actual temperature of the power module to the target temperature of the power module, and the ambient temperature of the charging pile, the actual temperature of the power module, the target temperature of the power module, and the heat loss of the power module.

10. The refrigerating system according to claim 7, wherein the heat management circuit is configured to:

obtain a heat loss of the charging gun based on a current and impedance of the charging gun; and obtain, based on the charging information, the ambient temperature of the charging pile, the actual temperature of the charging gun, the target temperature of the charging gun, the heat loss of the charging gun, and a second correspondence, the cooling power required for reducing the actual temperature of the charging gun to the target temperature of the charging gun, wherein the second correspondence indicates a correspondence between the cooling power required for reducing the actual temperature of the charging gun to the target temperature of the charging gun, and the ambient temperature of the charging pile, the actual temperature of the charging gun, the target temperature of the charging gun, and the heat loss of the charging gun.

11. The refrigerating system according to claim 6, wherein the heat management circuit is further configured to:

obtain a temperature difference between a temperature of the liquid refrigerant transmitted in any one of the plurality of first secondary pipes and a temperature of the gas refrigerant transmitted in a corresponding second secondary pipe in the plurality of second secondary pipes; and when the temperature difference is greater than a preset temperature threshold, control an opening degree of the throttle valve to increase; or when the temperature difference is lower than or equal to the preset temperature threshold, re-obtain a cooling power of the direct cooling module, control the direct cooling module to operate at the re-obtained cooling power of the direct cooling module, and control the opening degree of the throttle valve to decrease.

12. A charging system, comprising a charging pile and a refrigerating system, the refrigerating system comprises a heat management circuit, a direct cooling module, a plurality of heat exchange modules, and a plurality of cooling pipes, wherein an input end of the heat management circuit is configured to connect to a control module of the charging pile, an output end of the heat management circuit is configured to connect to an input end of the direct cooling module, an output end of the direct cooling module is configured to connect to a first end of a first pipe assembly, second ends of the first pipe assembly are configured to connect to input ends of the plurality of heat exchange modules and input ends of the plurality of cooling pipes, output ends of the heat exchange modules and output ends of the cooling pipes are configured to separately connect to first ends of a second pipe assembly, a second end of the second pipe assembly is configured to connect to an input end of the direct cooling module, each heat exchange module is further connected to a corresponding power module in the charging pile, and each cooling pipe is disposed inside a corresponding charging gun in the charging pile and a cable connected to the charging gun;

the heat management circuit is configured to send control information to the direct cooling module based on charging information from the control module, wherein the charging information indicates that the charging pile needs to charge a terminal device;

the direct cooling module is configured to: convert, based on the control information, a gas refrigerant transmitted in the second pipe assembly into a liquid refrigerant, and transmit the liquid refrigerant to each heat exchange module and each cooling pipe through the first pipe assembly;

each heat exchange module is configured to dissipate heat for the respective power module by using the liquid refrigerant; and the cooling pipe is configured to dissipate, by using the liquid refrigerant, heat for the charging gun and the cable connected to the charging gun.

13. The charging system according to claim 12, wherein the direct cooling module comprises a compressor, a condenser, and a fan, wherein an input end of the compressor is connected to the output end of the heat management circuit and the second pipe assembly, an output end of the compressor is connected to an input end of the condenser, an input end of the condenser is further connected to the output end of the heat management circuit, and an output end of the condenser is connected to the first pipe assembly;

the compressor is configured to: compress, based on the control information, the gas refrigerant transmitted in the second pipe assembly, and transmit the compressed gas refrigerant to the condenser;

the condenser is configured to: convert the compressed gas refrigerant into the liquid refrigerant based on the control information, and transmit the liquid refrigerant to each heat exchange module and each cooling pipe through the first pipe assembly; and the fan is configured to dissipate heat for the condenser.

14. The charging system according to claim 13, wherein the first pipe assembly comprises a first primary pipe and a plurality of first secondary pipes;

the plurality of first secondary pipes comprise a first part of first secondary pipes and a second part of first secondary pipes, the first part of first secondary pipes are connected to the plurality of heat exchange modules in a one-to-one correspondence, and the second part of first secondary pipes are connected to the plurality of cooling pipes in a one-to-one correspondence; and a first end of the first primary pipe is configured to connect to the output end of the condenser, second ends of the first primary pipe are configured to connect to first ends of the first part of first secondary pipes and first ends of the second part of first secondary pipes, a second end of a first secondary pipe in the first part of first secondary pipes is configured to correspondingly connect to a heat exchange module in the plurality of heat exchange modules, and a second end of a first secondary pipe in the second part of the first secondary pipes is configured to correspondingly connect to a cooling pipe in the plurality of cooling pipes.

15. The charging system according to claim 14, wherein a throttle valve is disposed on each first secondary pipe; and the throttle valve is configured to adjust a flow rate of the liquid refrigerant transmitted in each first secondary pipe.

16. The charging system according to claim 15, wherein the second pipe assembly comprises a second primary pipe and a plurality of second secondary pipes;

the plurality of second secondary pipes comprise a first part of second secondary pipes and a second part of second secondary pipes, the first part of second secondary pipes are in a one-to-one correspondence with the plurality of heat exchange modules, and the second part of second secondary pipes are in a one-to-one correspondence with the plurality of cooling pipes; and a first end of a second secondary pipe in the first part of second secondary pipes is configured to correspondingly connect to a heat exchange module in the plurality of heat exchange modules, a first end of a second secondary pipe in the second part of second secondary pipes is configured to correspondingly connect to a cooling pipe in the plurality of cooling pipes, second ends of the first part of second secondary pipes and second ends of the second part of second secondary pipes are configured to separately connect to first ends of the second primary pipe, and a second end of the second primary pipe is configured to connect to the input end of the direct cooling module.

17. The charging system according to claim 16, wherein the heat management circuit is configured to:

receive the charging information from the control module, and obtain an ambient temperature of the charging pile, an actual temperature of the power module, and the actual temperature of the charging gun;

when the actual temperature of the power module is higher than a preset first temperature upper limit for preset first duration, or when the actual temperature of the charging gun is higher than a preset second temperature upper limit for preset second duration, obtain a cooling power of the direct cooling module based on the charging information, the ambient temperature of the charging pile, the actual temperature of the power module, and the actual temperature of the charging gun; and deliver the cooling power of the direct cooling module as the control information to the direct cooling module, and control the throttle valve to open.

18. The charging system according to claim 17, wherein the heat management circuit is further configured to:

obtain a temperature difference between a temperature of the liquid refrigerant transmitted in any one of the plurality of first secondary pipes and a temperature of the gas refrigerant transmitted in a corresponding second secondary pipe in the plurality of second secondary pipes; and when the temperature difference is greater than a preset temperature threshold, control an opening degree of the throttle valve to increase; or when the temperature difference is lower than or equal to the preset temperature threshold, re-obtain a cooling power of the direct cooling module, control the direct cooling module to operate at the re-obtained cooling power of the direct cooling module, and control the opening degree of the throttle valve to decrease.

19. The charging system according to claim 18, wherein the charging system comprises one charging pile; and a heat management circuit is connected to a control module in the charging pile, and a direct cooling module and the heat management circuit are disposed inside the charging system.

20. The charging system according to claim 18, wherein the charging system comprises a plurality of charging piles, and the plurality of charging piles are connected in parallel; and a heat management circuit is connected to a control module in each of the plurality of charging piles, and both a direct cooling module and the heat management circuit are disposed outside the plurality of charging piles.

* * * * *